US009366389B2

(12) United States Patent
Stewart et al.

(10) Patent No.: US 9,366,389 B2
(45) Date of Patent: *Jun. 14, 2016

(54) SYSTEM AND METHOD FOR MONITORING INEFFICIENT FLOW RATES USING MAGNETIC SENSOR IN A LIQUID-FLOW DISTRIBUTION SYSTEM

(71) Applicant: CDS-John Blue Company, Huntsville, AL (US)

(72) Inventors: Jason T. Stewart, Harvest, AL (US); Bradley R. Thurow, Fargo, ND (US); David C. Batcheller, Fargo, ND (US); Robert M. Allen, Reiles Acres, ND (US); Steven S. Bailey, Fargo, ND (US); Christopher L. Giese, Fargo, ND (US)

(73) Assignee: CDS-John Blue Company, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,368

(22) Filed: Sep. 23, 2014

(65) Prior Publication Data

US 2015/0068320 A1 Mar. 12, 2015

Related U.S. Application Data

(63) Continuation of application No. 13/941,167, filed on Jul. 12, 2013, now Pat. No. 8,839,681.

(60) Provisional application No. 61/719,294, filed on Oct. 26, 2012.

(51) Int. Cl.
*B67D 7/56* (2010.01)
*G01F 1/00* (2006.01)
*F17D 5/00* (2006.01)

(Continued)

(52) U.S. Cl.
CPC .. *F17D 5/00* (2013.01); *G01F 1/52* (2013.01); *G01F 23/30* (2013.01)

(58) Field of Classification Search
None
See application file for complete search history.

(56) References Cited

U.S. PATENT DOCUMENTS 3,527,928 A 9/1970 Ryder et al.
3,537,091 A 10/1970 Schenkenberg
(Continued)

OTHER PUBLICATIONS

"CDS-John Blue Next Generation Electronic Liquid Blockage Moniter System", News Flow, quarterly newsletter of CDS-John Blue Company, vol. 13, Issue 47, pp. 1-2, Spring 2013.
(Continued)

*Primary Examiner* — Harshad R Patel
(74) *Attorney, Agent, or Firm* — Law Office of Mark Brown, LLC; Mark E. Brown; Christopher M. DeBacker

(57) ABSTRACT

A system and method for monitoring inefficient flow rates in a liquid-flow distribution system, such as that which is used in agricultural liquid application equipment. This may include blockages or punctures in a liquid line. The system generally includes a plurality of gauges for monitoring the supply line flow rate in a liquid application system which are monitored by a number of sensors. Immediate feedback is presented to the operator of the vehicle inside the cab. The system alerts the operator when a blockage, loss, or increase of flow rate has occurred in one of the liquid lines. The system may merely indicate that one of the lines is blocked, or the system may be more sophisticated such that it can indicate which line is blocked and adjust the flow in that line in an attempt to clear the blockage.

1 Claim, 23 Drawing Sheets

(51) Int. Cl.
*G01F 1/52* (2006.01)
*G01F 23/30* (2006.01)

(56) References Cited

U.S. PATENT DOCUMENTS

| | | |
|---|---|---|
| 3,723,989 A | 3/1973 | Fathauer et al. |
| 4,009,799 A | 3/1977 | Fathauer |
| 4,100,538 A | 7/1978 | Knepler |
| 4,149,163 A | 4/1979 | Fathauer |
| 4,159,064 A | 6/1979 | Hood |
| 4,253,766 A | 3/1981 | Funk |
| 4,268,825 A | 5/1981 | Kaplan |
| 4,369,895 A | 1/1983 | McCarty et al. |
| 4,401,909 A | 8/1983 | Gorsek |
| 4,555,624 A | 11/1985 | Steffen |
| 4,782,282 A | 11/1988 | Bachman |
| 4,803,626 A | 2/1989 | Bachman et al. |
| 4,986,782 A | 1/1991 | Severtson |
| 5,170,820 A | 12/1992 | Jones |
| 5,193,400 A | 3/1993 | Lew |
| 5,260,875 A | 11/1993 | Tofte et al. |
| 5,323,721 A | 6/1994 | Tofte et al. |
| 5,475,614 A | 12/1995 | Tofte et al. |
| 5,520,333 A | 5/1996 | Tofte |
| 5,574,657 A | 11/1996 | Tofte et al. |
| 5,635,911 A | 6/1997 | Landers et al. |
| 5,884,205 A | 3/1999 | Elmore et al. |
| 5,897,600 A | 4/1999 | Elmore et al. |
| 5,967,066 A | 10/1999 | Giles et al. |
| 6,269,757 B1 | 8/2001 | Kiest |
| 6,850,849 B1 | 2/2005 | Roys |
| 7,710,282 B1 | 5/2010 | Young |
| 7,720,574 B1 | 5/2010 | Roys |
| 7,739,921 B1 | 6/2010 | Babcock |
| 7,782,461 B1 | 8/2010 | Massey et al. |
| 7,970,558 B1 | 6/2011 | Roys |
| 8,839,681 B2 * | 9/2014 | Stewart .............. G01F 1/52 73/314 |
| 2009/0240118 A1 * | 9/2009 | Aggarwal ............ A61B 5/0002 600/301 |
| 2012/0152376 A1 | 6/2012 | He et al. |
| 2012/0216732 A1 | 8/2012 | Ballard et al. |

OTHER PUBLICATIONS

"CDS-John Blue VisaGage II Flow Monitor", From the CDS-John Blue catalogue at http://www.cds-johnblue.com/cds-johnblue-pump-catalog.pdf, Aug. 2012.

"International Search Report and Written Opinion", PCT/US2013/066958, Mar. 5, 2014.

"Planter & Grain Drill Fertilizer Application Systems: GX7", Schaffert Manufacturing & Sales; Obtained at the 2012 National Farm Machinery Show in Louisville, KY, Feb. 2012.

* cited by examiner

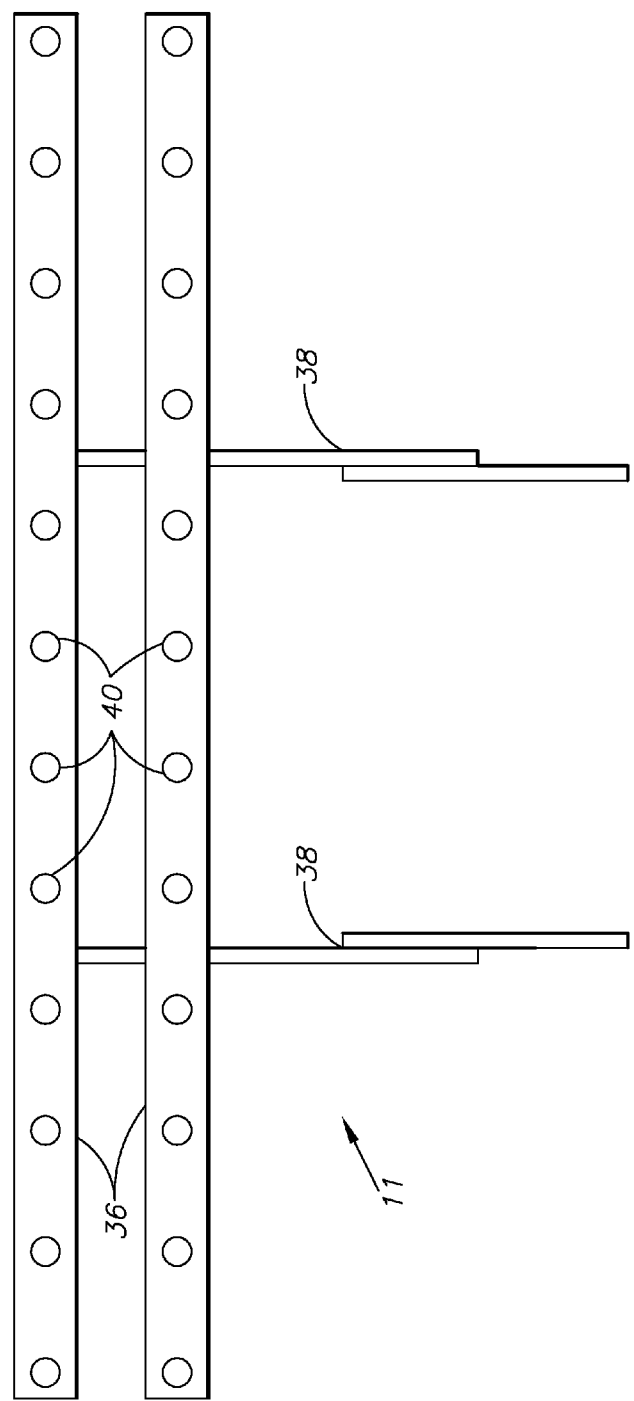

DISLPLAY WIRING

SESNOR WIRING

FIG. 19 SESNOR WIRING

SYSTEM AND METHOD FOR MONITORING INEFFICIENT FLOW RATES USING MAGNETIC SENSOR IN A LIQUID-FLOW DISTRIBUTION SYSTEM

CROSS-REFERENCE TO RELATED APPLICATIONS

This application is a continuation of and claims priority in U.S. patent application Ser. No. 13/941,167, filed Jul. 12, 2013, now U.S. Pat. No. 8,839,681, issued Sep. 23, 2014, which claims priority in U.S. Provisional Patent Application Ser. No. 61/719,294, filed Oct. 26, 2012, which is incorporated herein by reference.

BACKGROUND OF THE INVENTION

1. Field of the Invention

The present invention relates generally to liquid flow controls and monitoring, and in particular to a blockage monitor for liquid application equipment, such as sprayers used for agricultural and related applications.

2. Description of the Related Art

Monitoring liquid flow is an important function in various equipment for dispensing, spraying and applying liquid material. For example, agricultural operations commonly involve applying liquid fertilizer, insecticide and herbicide. As an example, agricultural spraying equipment is typically configured for liquid applications over multiple rows per pass. The equipment is commonly configured for applying liquid on eight or more rows simultaneously. Some examples of multi-row equipment include: planters, applicators, cultivators, coulters, etc.

Row crops, which account for a large portion of overall agricultural production, typically require several field operations with different types of equipment. These can include tilling, planting, fertilizing and harvesting operations. Moreover, crop yields often benefit from the application of herbicides, insecticides and pesticides. Liquid application operations are conducted to maximize uniform coverage while minimizing waste, overlap and equipment fuel consumption. Such objectives can be achieved by, for example, efficiently guiding the equipment in evenly-spaced, parallel passes in either straight-line or contour guidance modes of operation. Optimum, uniform crop yields tend to result from even liquid application coverage and precise equipment guidance and control procedures.

Liquid application equipment, such as agricultural sprayers, may be susceptible to liquid flow blockage and restriction from various sources. For example, debris from the fluid reservoirs, such as liquid applicator tanks, can become lodged in fluid outlets and other discharge components. In many agricultural tractor-liquid applicator configurations, the liquid applicators are located some distance behind the operators. The operators are thus unable to directly observe the operation of the liquid applicators while driving the equipment. Consequently, individual, blocked liquid lines and applicators are often undetected by the equipment operators, with resultant gaps in the material application. Uniform material application and ultimately crop yields can be compromised by liquid application coverage gaps.

Automated agricultural operations commonly use information management via the Internet for purposes of monitoring, reporting and controlling various aspects of agricultural operations. For example, liquid chemical applications are often documented for billing and record-keeping purposes. Accurate records of operations are useful to operators and owners in connection with monitoring crop yields based on chemical applications, record-keeping, billing and other information management aspects. Accurate records of agricultural chemical applications are commonly useful for purposes of insuring consistent flow rates for maximizing crop yields.

Visual flow blockage monitors have previously been installed in agricultural liquid application equipment. For example, CDS-John Blue Corporation of Huntsville, Ala. manufacturers and markets the VisaGage line of liquid application flow monitors, which utilize transparent columns each associated with an individual liquid applicator fluid outlet in a multi-row liquid applicator. Operators can visually observe indicator ball locations and thereby detect blocked liquid applicator lines when the flow rate responsive balls drop below threshold operating levels. Such visual indicator systems tend to be highly reliable, even under adverse operating conditions because they rely on only one moving part, the flow rate level indicator ball, and because operators can reliably observe the ball locations associated with multiple liquid applicators and thus quickly discern the inoperative condition of any particular liquid applicator.

Although such visual liquid application monitoring procedures have been successfully used for a number of years, visual observation procedures performed by individuals can be enhanced and improved by combining such flow indicators with automated, electronic sensing equipment for tracking the individual fluid outlet operations.

Heretofore there has not been available a flow monitor system and method with the features of the present invention. These include automated monitoring of individual fluid outlets; operation under various lighting and visibility conditions; "heads-up" display monitoring by equipment operators; and operation reporting capabilities via Internet, cloud-based utilities and other automated functions.

SUMMARY OF THE INVENTION

The present invention relates to a system and method for monitoring for blockages in a liquid-flow system, such as an agricultural liquid applicator. The system generally includes a plurality of gauges for monitoring the supply line flow rate in a liquid applicator system which are monitored by a number of sensors. Immediate feedback is presented to the operator of the agricultural vehicle inside the cab. The system alerts the operator when a blockage or loss of flow rate has occurred in one of the liquid lines. The system may merely indicate that one of the lines is blocked, or the system may be more sophisticated such that it can indicate which line is blocked.

A typical liquid applicator set-up includes a "right" side and a "left" side array of fluid outlets. Each applicator requires a supply line from a pump or a flow-divider element. The present invention is placed between the pump or the flow-divider and the liquid applicator. The present invention includes a gauge with a number of pre-determined levels. The gauge monitors the flow rate as the liquid is dispensed through the supply lines to the applicators. If a drop in flow occurs within a supply line, such as could be caused by a blockage within the line, the vehicle operator is immediately notified of the flow drop. Generally, a higher flow level reading indicates a higher fluid flow rate through the system. Depending on the application of chemicals or fertilizers, the operator may desire a higher or a lower flow rate, thereby requiring a higher or lower flow within the gauges. The "threshold" flow level, which is decided and set by the operator using a user interface device within the vehicle cab, depends upon this flow rate.

The operator can adjust the level of sensitivity of the system on the fly, depending on the level of flow required to adequately dispense the liquid contained within the storage tank. The flow level is monitored by a number of sensors which monitor the level of a ball within each gauge. As the flow rises within the gauge, the ball should rise. The system monitors the ball level and reports to the operator when the ball has dropped to a pre-determined threshold level.

Similarly, in the event of a broken or punctured line, the result may be too much flow through the liquid flow monitoring system. In such a situation, the indicator ball would float very high or even to the top of the flow gauge. The present invention would also be able to determine such a situation and alert the user to the problem.

The present invention provides a less invasive means for monitoring liquid flow blockage within an agricultural liquid applicator system. The use of magnetic field sensors/Hall-Effect sensors to sense the level of a magnetized ball within a flow gauge is less susceptible to fluid contamination problems as compared with flow meters, pressure gauges, or other devices.

BRIEF DESCRIPTION OF THE DRAWINGS

The drawings constitute a part of this specification and include exemplary embodiments of the present invention illustrating various objects and features thereof.

FIG. 7 is a front elevational view of a mounting stand employed in an embodiment of the present invention.

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The scope of the present invention is to implement a liquid flow monitoring system 2 capable of notifying the user of blockages within a liquid applicator distribution run. The liquid flow monitoring system 2 will pair sensing components with flow monitor gauges 4. Each gauge will contain a magnetic level indicator ball 34 which moves vertically in proportion to the flow rate of the respective run. These balls will be electronically monitored and used to report abnormal flow through each liquid applicator run.

II. Preferred Embodiment or Aspect Liquid Flow Blockage Monitoring System 2

Figure 1:
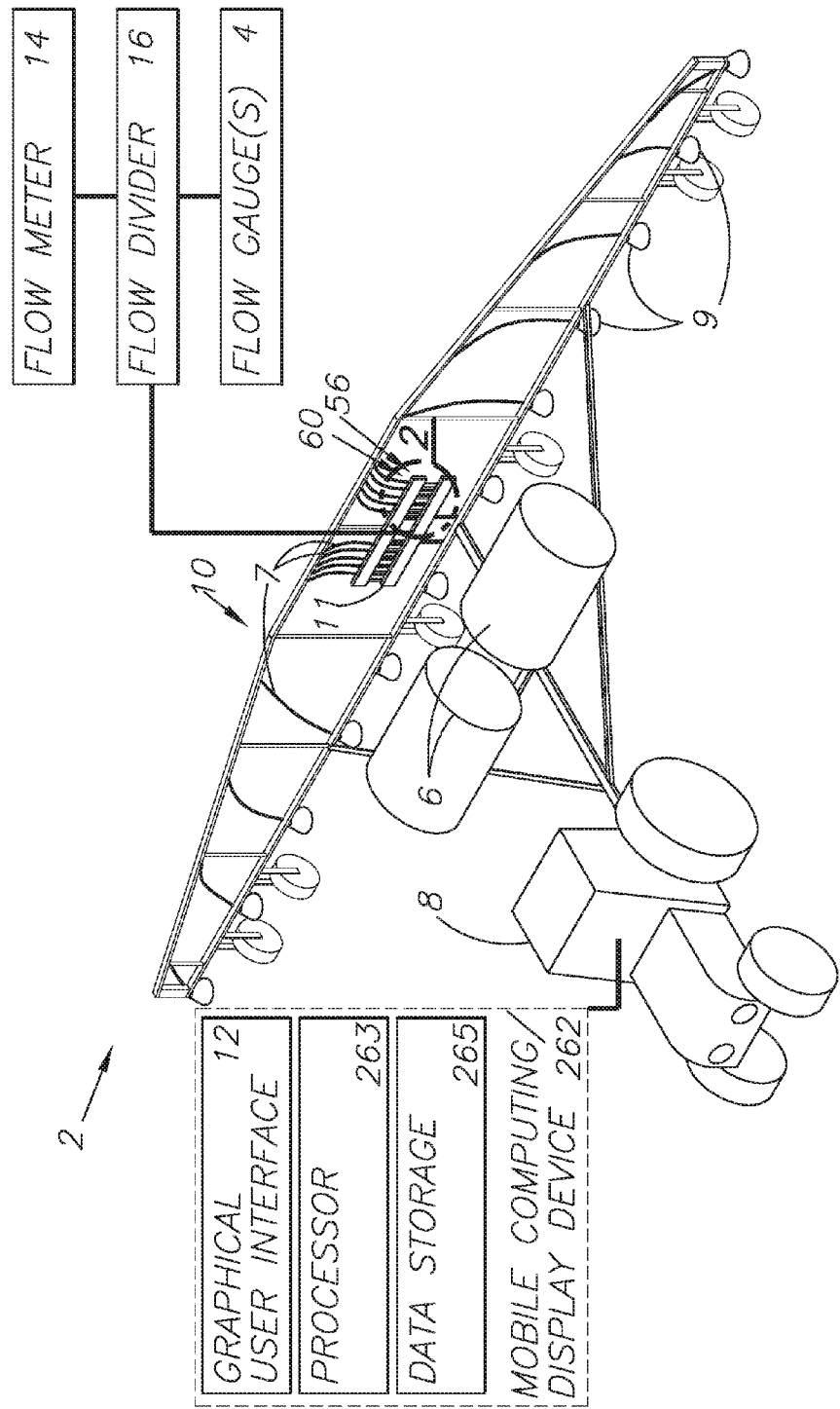
FIG. 1 is an isometric view of an embodiment of the present invention employed in a typical environment including an agricultural liquid applicator.

An embodiment of a liquid flow blockage monitoring system 2 for use in an agricultural liquid applicator is presented. The monitoring system 2 provides a customizable, automated method of monitoring the flow rate in a number of liquid applicator lines 7 in an agricultural liquid applicator system. As shown in FIG. 1, the system includes an interactive user display 12 located in a vehicle 8 cab. The display allows the operator of the vehicle to set a minimum flow rate threshold and monitor the flow rate in each liquid applicator line, and alerts the operator when the flow rate in one of these lines drops below the set threshold.

A typical set-up employs an agricultural vehicle 8, such as a tractor, towing an implement 10 including a liquid applicator tank 6, a number of liquid applicators 9, and liquid lines 7 which move liquid stored in the tank to the applicators. The liquid may be divided prior to entering the flow gauges 4 using a flow divider 16, and may also pass through a flow meter 14 which ensures the proper flow rate to the liquid applicators 9. During operation, the lines or applicators can become blocked with debris, thereby partially or completely interrupting the application from one or more liquid applicators.

Previous systems have been used to alert the operator that a block has occurred in a liquid line. One such system, which can be employed along-side the present invention, is the Visa-Gage II Liquid Flow Rate Monitor by CDS-John Blue Company, a division of Advanced System Technology, of Huntsville, Ala. These previous systems require that the operator has a clear visual path to the gauges to determine if flow has dropped in one of the lines due to blockage. This also requires the operator to take his eyes off of the current driving path just to verify that the liquid applicator lines are clear.

Typical visual flow blockage monitoring devices allow liquid to flow through the visual gage, indicating to the operator visually whether a blockage has occurred or not. Depending on the system, each gauge may include a bottom inlet 30 to accept divided flow through each gauge, or the gauges may be joined together via a common inlet 23 running perpendicular to the gauges, wherein the flow is not divided until it reaches the gauges.

The present invention employs visual gauges 4, such as the VisaGage II, mounted to the liquid applicator implement 10 via a mounting rack 11 using mounting bolts 19 fed through a mounting plate 24 on the gauge 4. As shown in more detail at FIGS. 4 and 5, the typical visual gauges employ a ball 34 suspended within a housing 26. The liquid being applied to a field is fed through the housing 26, either via a bottom inlet 30 or a common perpendicular inlet 23, and is fed to the liquid applicator line 7 via a top outlet 28. Indicator markings 32 along the surface of the housing 26 give the operator a visual check of where the ball 34 is suspended within the gauge 4. If a blockage has occurred, the ball will drop to a lower level within the gauge, indicating the blockage to the operator.

Figure 2:
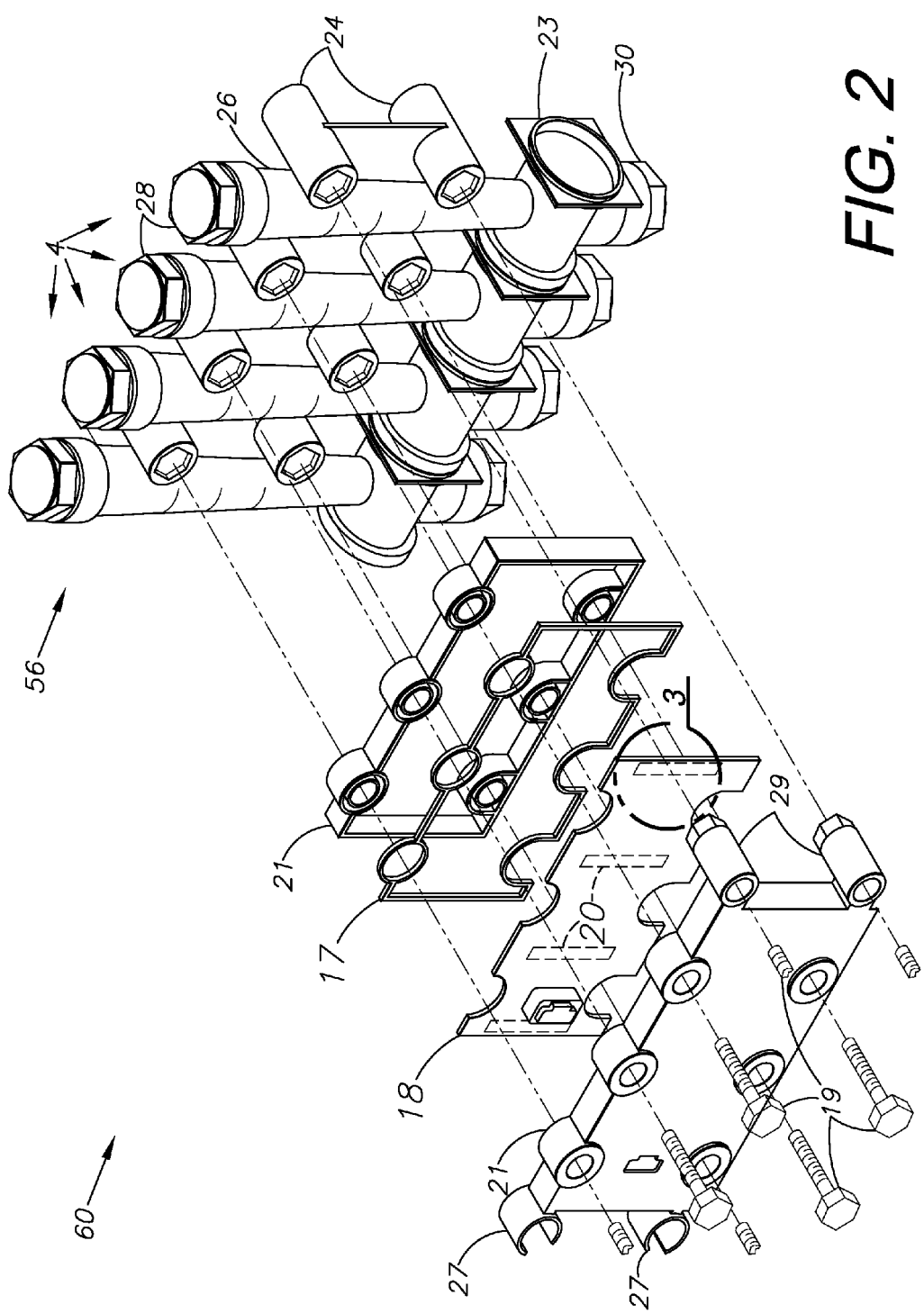
FIG. 2 is an exploded-isometric view of an embodiment of the present invention.

FIG. 2 demonstrates the typical construction of a sensor system node 60 for monitoring flow rate blockage in a liquid applicator system. The sensor system includes a housing 21 which contains a printed circuit board (PCB) 18 and a gasket 17. It is ideal that the housing be water-tight because of the nature of agricultural spraying and other liquid application systems. Liquid entering the housing could damage the sensitive electronic circuitry. A number of sensor arrays 20 are mounted to the PCB 18. The housing is adapted to be mounted to an array 56 of flow gauges 4, such as the visual flow gauges discussed above, via a number of mounting bolts 19. A typical set-up employs a set of four flow gauges 4 connected into an array. An ideal sensor system would adapt to one series of four flow gauges; however, a system could employ a single gauge 4 and a single sensor system if desired. Any number of gauges and sensor arrays 20 could theoretically be used.

The sensor system housing 21 ideally includes a pair of clips 27 adapted for interlocking with an adjacent sensor system housing via a pair of offset bolt connectors 29. As shown in FIG. 2, the offset bolt connectors 29 are also adapted to be fit into one set of bolt accepting holes 25 located in one of the interlocked gauges 4.

Figure 3:
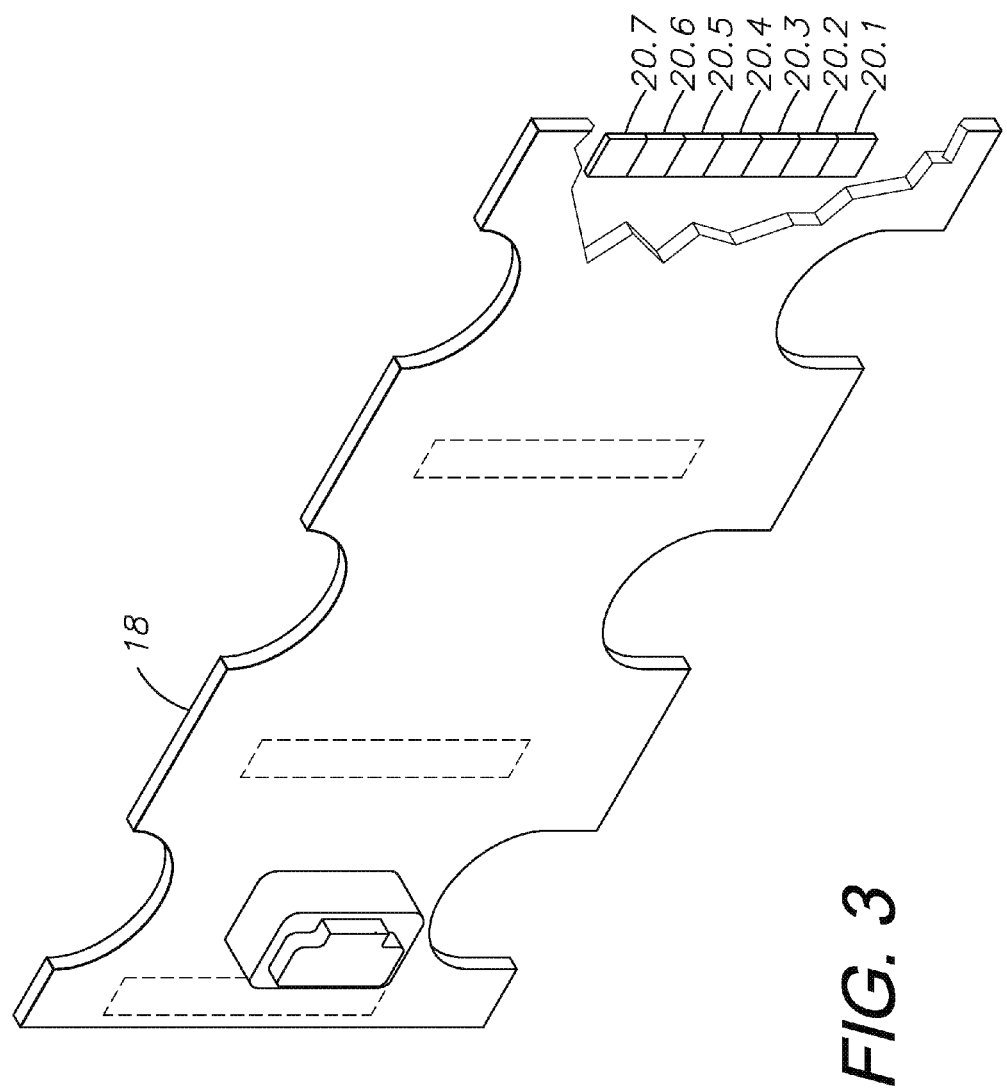
FIG. 3 is a detailed isometric view of a printed circuit board and sensor array taken about the circle 3 in FIG. 2.

FIG. 3 demonstrates the sensor array 20 mounted to the PCB 18 in more detail. In a preferred embodiment, seven sensors 20.1, 20.2, 20.3, 20.4, 20.5, 20.6, and 20.7 are used to measure seven levels within the gauge 4. A multiplexed Hall-Effect sensor array, as shown, is the preferred method of measuring the level of a magnetized ball 34 located within the gauge housing 26. A Hall-Effect sensor is ideal for the preferred embodiment of the present invention because they are used primarily for proximity or positioning detection. When using a visual gauge such as defined and described above, the position of each sensor 20.1-20.7 in the array corresponds to an indicator marking 32 located on the housing 26 of the gauge 4. Thus if the magnetized ball 34 is at visual marking number six, the sixth sensor 20.6 would measure the ball's position and report it to the monitoring system. The surrounding sensors 20.7 and 20.5 would also likely receive some indication of the ball's position, though the signal would be faint in comparison. The measurement of all three sensors would produce a precise report of the ball's 34 position to the display device 12.

Figures 4A, 4B:
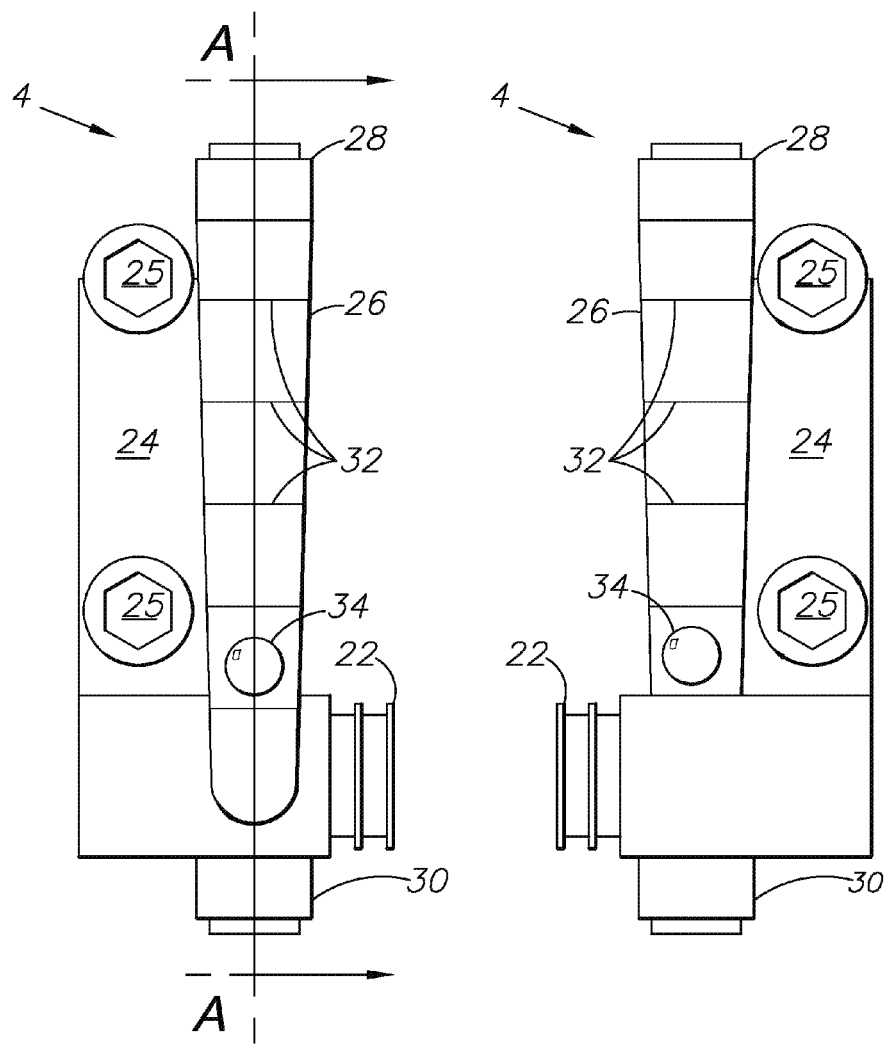
FIG. 4A is a front elevational view of a flow gauge monitor element employed in an embodiment of the present invention.
FIG. 4B is a rear elevational view of a flow gauge monitor element employed in an embodiment of the present invention.
Figure 5A:
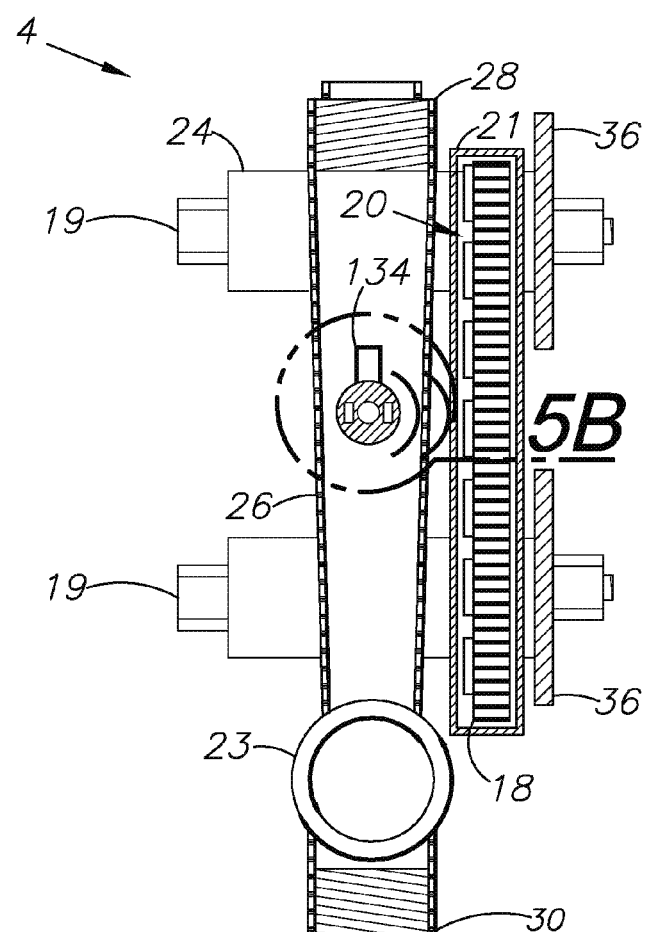
FIG. 5A is a cross-sectional view of a flow gauge monitor element employed in an embodiment of the present invention taken about the sectional line A-A of FIG. 4A.

FIGS. 4A and 4B provide elevational views, and FIG. 5A provides a section of a gauge 4 showing the sensor array housing 21 between the gauge and a pair of mounting plates 36. The position of each sensor in the sensor array is more clearly visualized here. It should be noted that additional or fewer sensors could be used, resulting in a different number of position levels. It should also be noted that in a preferred embodiment, the upper most sensor 20.7 is used to error check the sixth level in the monitoring system. Typically only six levels of the ball's position will be monitored, however the seventh sensor is used to confirm the ball's 34 position should it rise above the sixth level.

FIGS. 6A-6D show a first type of level-indicating ball 34. This ball is constructed by placing two halves together. Protrusions 35 are used as necessary to provide a leak-free seal between the two halves. Magnets are inserted into recesses 33 located internally once the ball 34 halves are placed together and welded or otherwise joined. One issue with this particular construction is that the magnets may align their poles with a neighboring magnetized ball, which prevents the strongest portion of the magnetic field from facing the sensor 20. Also, if the attraction between neighboring ball magnets becomes lost, the ball orientation becomes unpredictable.

Figure 5B:
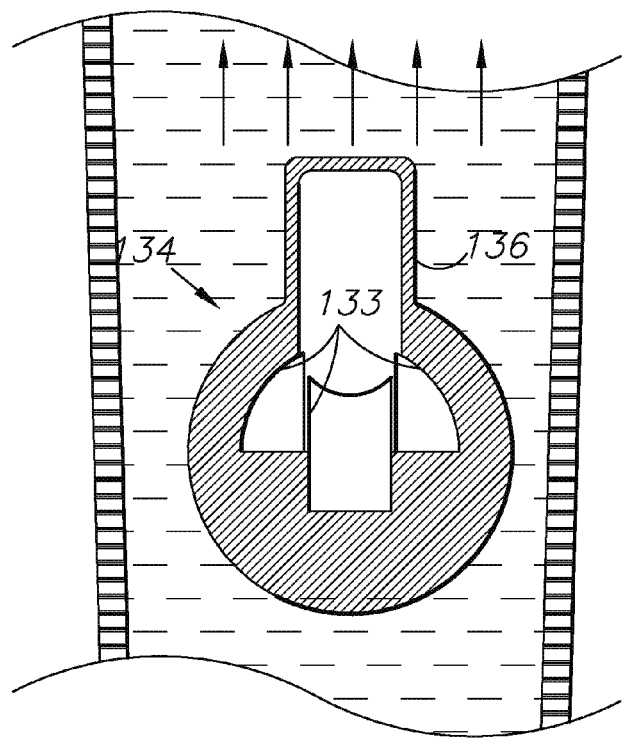
FIG. 5B is a detailed cross-sectional view taken about the circle of FIG. 5A.
Figure 5C:
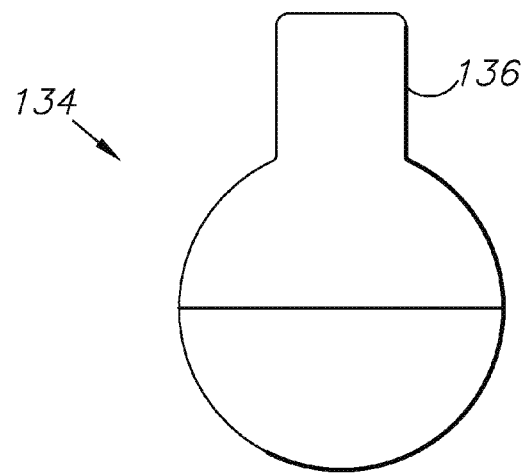
FIG. 5C is an elevational view of the indicator ball element of FIGS. 5A and 5B.
Figure 6C:
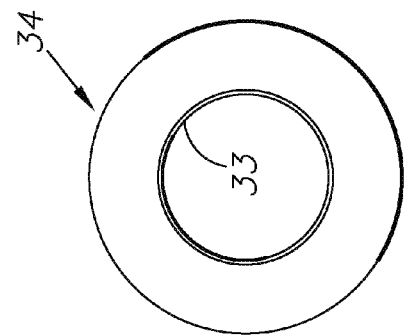
FIG. 6C is a plan view of a second half of a level-indicating ball.
Figure 6B:
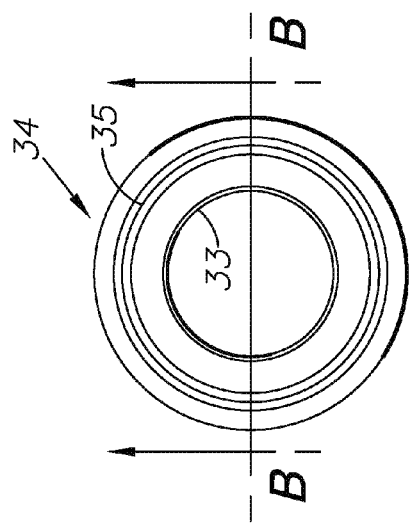
FIG. 6B is a plan view of a first half of a level-indicating ball.
Figure 6D:
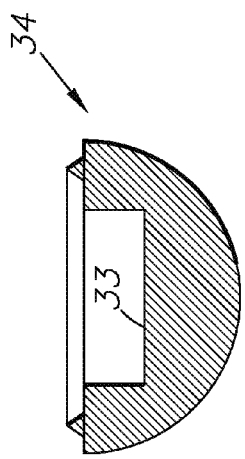
FIG. 6D is a cross-sectional view of a first half of a level-indicating ball as taken about the section line B-B of FIG. 6B.
Figure 6A:
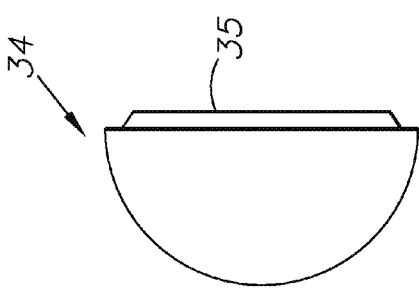
FIG. 6A is an elevational view of a first half of a level-indicating ball.
Figure 6G:
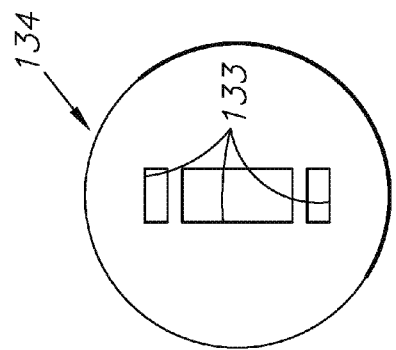
FIG. 6G is a plan view of a second half of an alternative embodiment level-indicating ball.
Figure 6F:
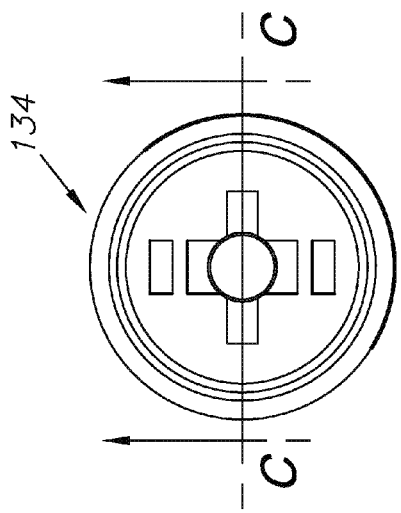
FIG. 6F is a plan view of a first half of an alternative embodiment level-indicating ball.
Figure 6H:
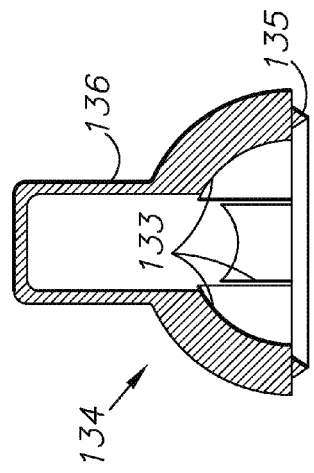
FIG. 6H is a cross-sectional view of a first half of an alternative embodiment level-indicating ball as taken about the section line C-C of FIG. 6F.
Figure 6E:
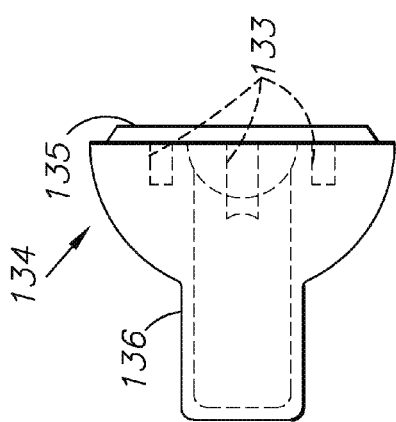
FIG. 6E is an elevational view of a first half of an alternative embodiment level-indicating ball.

FIGS. 6E-6H, along with FIGS. 5A-5C, show a second, alternative level-indicating ball 134 aimed at addressing the issues mentioned above. Multiple magnets are inserted into multiple recesses 133. Again, protrusions 135 are used as necessary to produce a leak-free seal between the two ball halves. With the arrangement shown, the magnet poles may be aimed directly at the sensors 20, which produces a stronger reading. The tail 136 portion of the ball 134 maintains a vertical orientation of the ball when suspended within the gauge body 26, ensuring correct magnet orientation relative to the sensor 20. The tail 136 may be hollow (as shown) to promote buoyancy, but does not necessarily have to be hollow. Even in the event that the magnetic alignment between neighboring balls is "broken," the tail will maintain the vertical orientation, and the presence of four perpendicular magnetic poles will excite the sensor 20. FIG. 5C indicates the ball being suspended within the housing 26 while water flow is traveling through the housing in the direction of the arrows shown.

Another possibility would be to add a guiding rod or feature inside of the gauge body 26 to control the ball orientation. However, this is not ideal because particulates from fertilizer could become lodged between the rod and the ball causing it to jam. The design described above is the more desirable because there are fewer interacting parts and fewer failure modes.

FIG. 7 shows a typical mounting rack 11 which could be mounted to a liquid applicator implement 10 via a pair of mounting legs 38. The mounting rack 11 includes two mounting plates 36 with a plurality of bolt holes 40 for accepting mounting bolts 19. These correspond to the mounting bolt holes 25 of the flow rate gauges 4.

Figure 8:
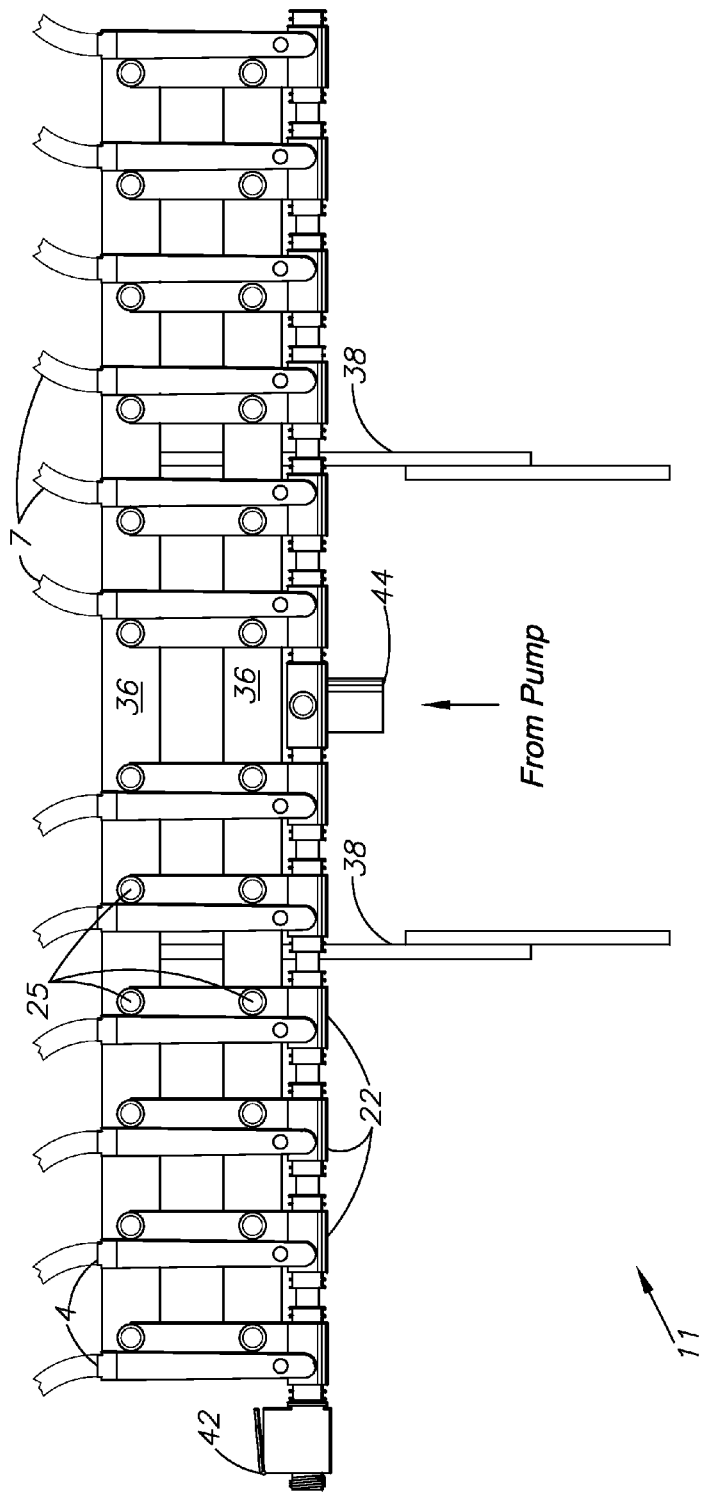
FIG. 8 is a front elevational view of a mounting stand including a plurality of flow gauge monitor elements employed in an embodiment of the present invention.

FIG. 8 shows an array of flow rate gauges 4 mounted to the mounting rack 11 of FIG. 7. FIG. 8, unlike FIGS. 2-5, shows visual flow rate gauges 4 connected via a common liquid input line 22 running perpendicular to the gauge housings 26. Liquid enters the system through an input port 44 and flows through the input line 22, at which point it enters the flow gauge housings 26 and exits through the upper outlets 28 and proceeds to the liquid applicators 9 via the liquid lines 7. The gauges 4 may be mechanically snapped together as shown, as is a feature of the VisaGage II visual flow gauge discussed above. A ball storage unit 42 may be similarly mechanically connected to one or both ends of the array of gauges 4.

Figure 9:
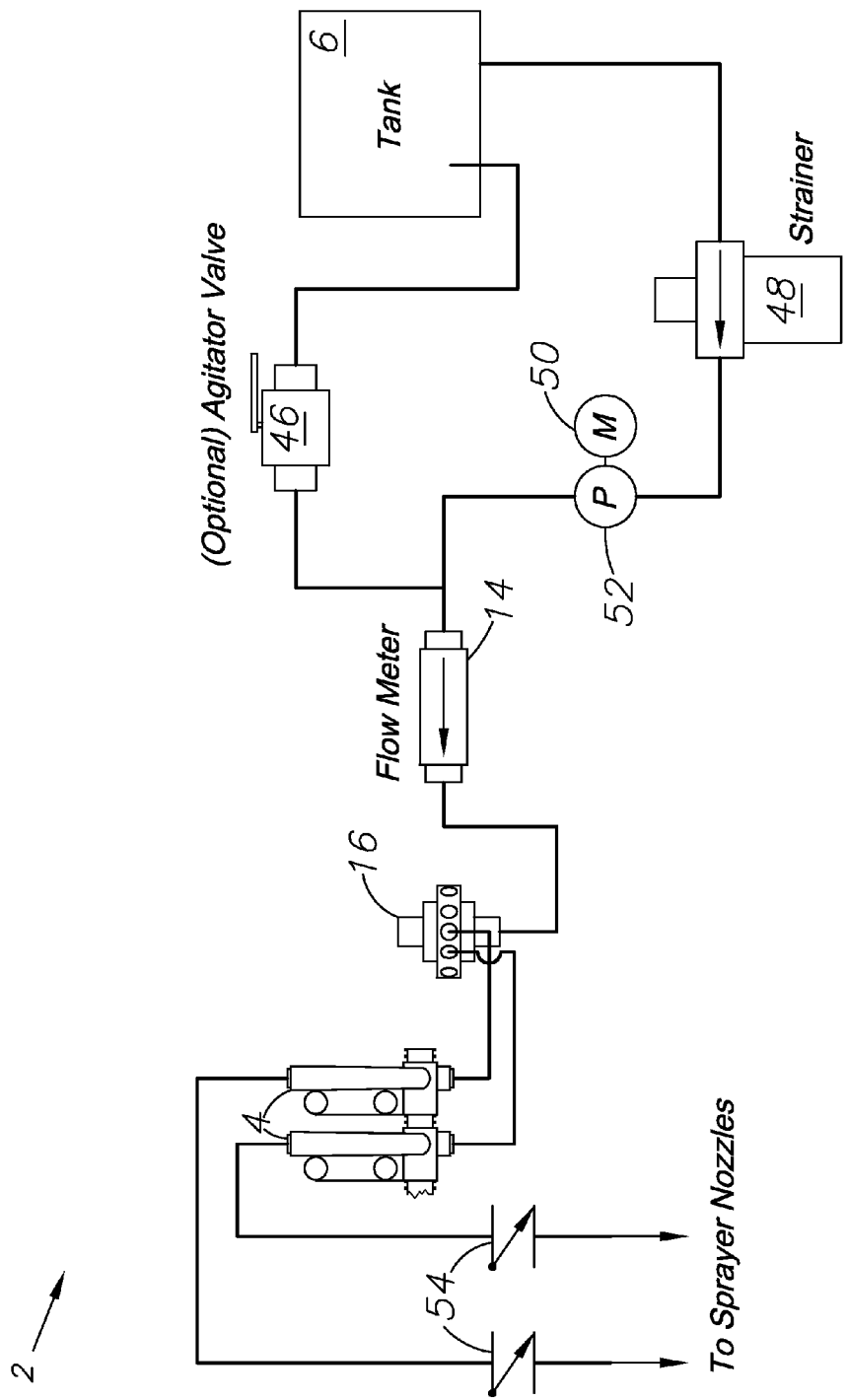
FIG. 9 is a schematic diagram of a system embodying an aspect of the present invention.

FIG. 9 shows a general diagram of the liquid application system as employed in a preferred embodiment of the flow rate monitoring system 2. A tank 6 stores the liquid which is to be applied to a field via the various liquid applicators 9. The liquid flows through a strainer 48 which ideally removes any debris which could block a liquid line 7 or applicator 9. A pump 52 powered by a motor 50 operates to move the liquid throughout the entire system. An optional agitator valve 46 may be attached to the system to ensure that the liquid stored in the tank flows freely.

The liquid passes through a flow meter 14 which measures the flow rate and ensures that the rate is optimal for the liquid being applied. An optional flow divider 16 can be used to separate the flow of the liquid prior to sending the liquid through the array of flow gauges 4. Finally, check valves 54 are placed in the line prior to the liquid reaching the liquid applicators.

Figure 10:
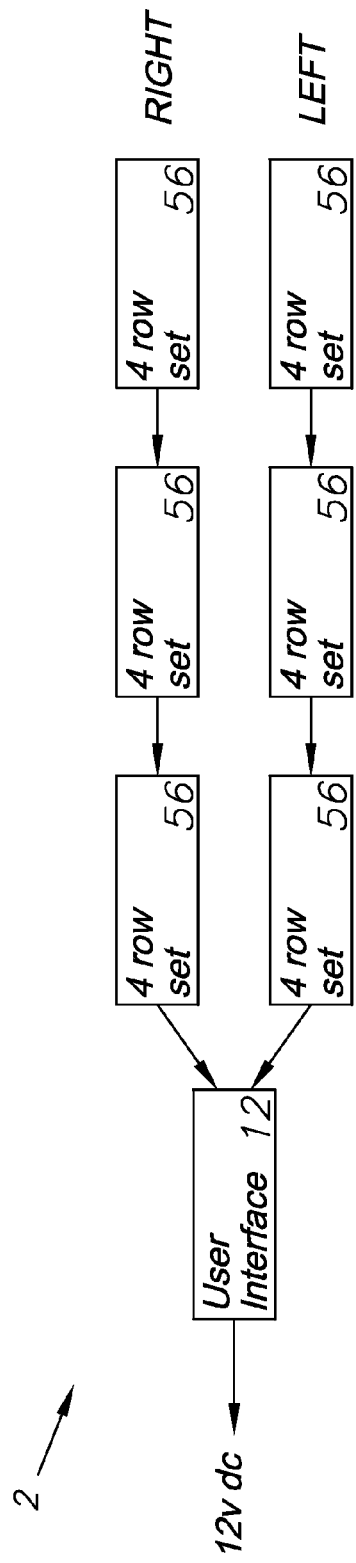
FIG. 10 is a box-diagram schematic of a system embodying an aspect of the present invention.

FIG. 10 shows a general box diagram of a typical set-up employing three sets 56 or arrays of four flow gauges 4 mounted on either side of the liquid applicator implement 10. As shown, three sets 56 are mounted to each of the left and right sides of the liquid applicator, respectively. Each set 56 is electronically wired to the adjacent set of gauges, and each side is separately wired to the user interface 12. The user interface is triggered if any gauge 4 within any array 56 is triggered, thereby indicated to the operator that a blockage has occurred either on the right side or the left side of the liquid applicator.

Figure 11:
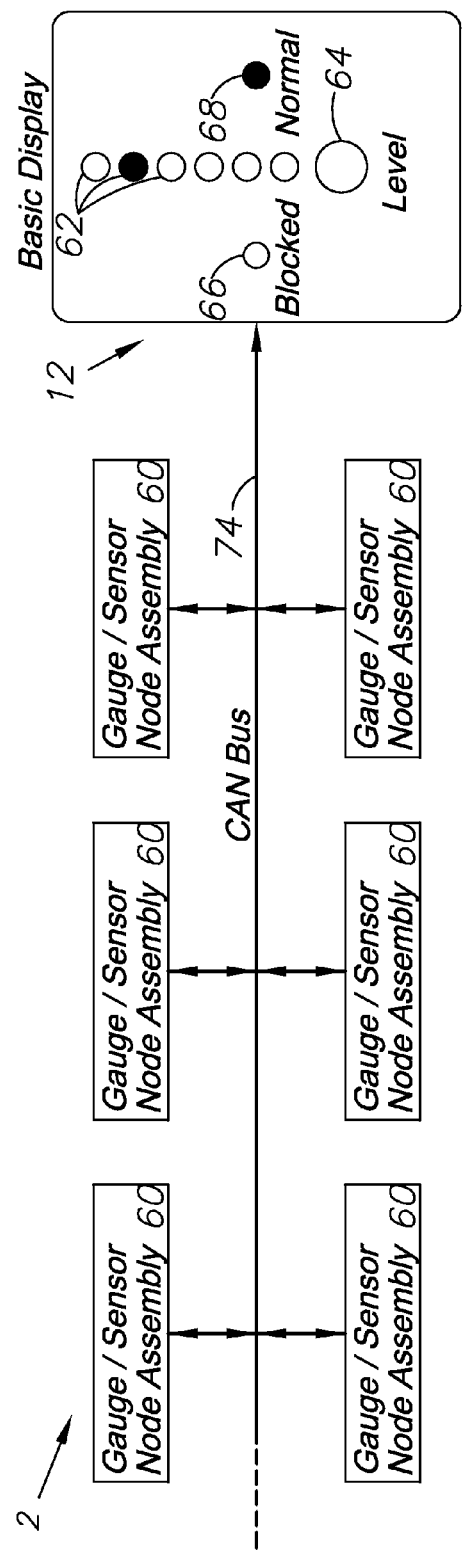
FIG. 11 is a box-diagram schematic of a system embodying an aspect of the present invention pertaining specifically to the interaction between a plurality of sensor elements and a display device.

FIG. 11 provides a basic example of how the gauge and sensor system node assemblies 60, as shown in detail at FIG. 2, communicate with a user interface 12. FIG. 11 demonstrates a system whereby a standard controller area network (CAN) bus 74 electrically communicates the signals from the sensor system node assemblies 60 to the user interface 12. The display 12 includes a plurality of level indicator light emitting diodes (LEDs) 62 corresponding to the ball 34 level with the gauge housing 26. A separate "blocked" status LED 66 can be provided to indicate that a sensor has indicated a blockage within one or more of the liquid lines. A separate "normal" status LED 68 may be included to indicate when all of the liquid lines are flowing normally. A push button 64 allows the operator to set the threshold level for the system to return a "blocked" or "normal" status output. The operator can press and hold the push button to change the threshold level, which is indicated to the operator by the level LEDs 62 lighting up to indicate a particular level. The level LEDs 62 may also light up to indicate at what level the ball 34 in each flow gauge 4 is currently.

Figure 12:
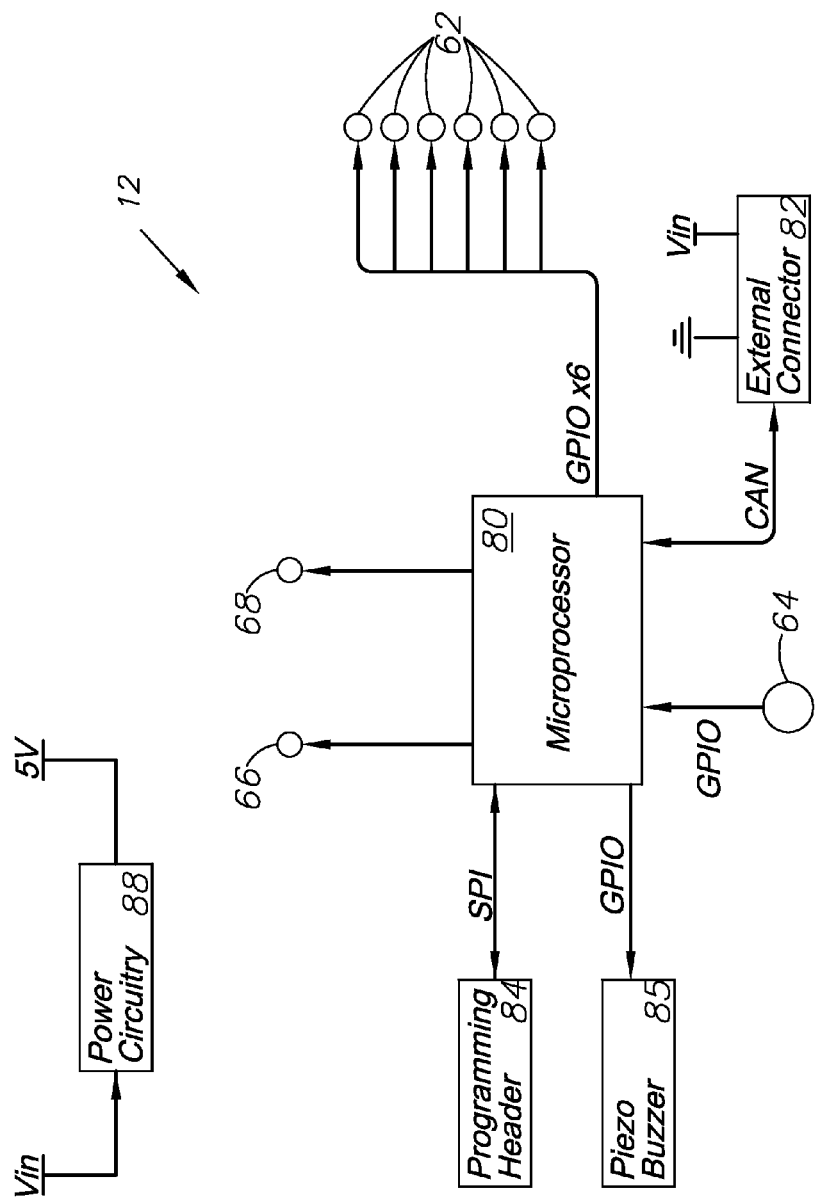
FIG. 12 is a wiring schematic diagram for a display device for use in an embodiment of the present invention.

FIG. 12 is a wiring diagram for a user interface 12 display. At the core of the display is a microprocessor 80, such as an 8-bit Atmel ATmega series processor manufactured by Atmel Corporation of San Jose, Calif. The microprocessor includes mounted software for handling the various commands received from the sensor nodes 60 and the push button 64. This microprocessor receives signal commands from the various sensor nodes 60 and reports information to the operator via the status LEDs 66, 68 and level LEDs 62. An optional piezo buzzer 85 may provide additional information to the operator via an audible noise when a "blocked" status is received. The push button 64 is also connected to the microprocessor, which then adjusts the threshold level as the operator pushes and holds down the button. A programming header 84 is connected to the microprocessor 80. The processor is also connected to an external connector 82. Power circuitry 88 is included to handle power to the display wiring circuit.

The microprocessor software code base is responsible for monitoring data provided by the sensor modules within the system and presenting system status to the user. The microprocessor software is not based on a high level operating system but will instead use a cyclic executive real-time scheduler to keep precise timing of task execution with low overhead. Listed below are the primary components of the microprocessor software and their responsibilities:

Bootloader: Provides ability to write an updated application to the internal flash and load the application from flash and execute it.
Scheduler: Manages the execution and timing of all tasks.
Flow Metric Processor: Performs flow analysis calculations and filtering based on raw sensor data.
CAN Message Processor: Filters and processes incoming messages from the CAN bus 74.
User Interface Processor: Accepts inputs from the user and drives visual and audible indicators based on system status.
Tasks: Schedulable items of the system that represent an execution path of code that will be run for a defined interval.
CAN Receiver Processing
Audible Alarm Update
Visual Alarm Update
Services: Implement logic that uses a component or driver to produce a desired behavior.
Scheduler
Configuration
Components: Represent hardware devices external to the microprocessor. Their implementations are specific to the part number they are designed for and make use of one or more drivers to interface with the microprocessor/peripherals.

Figure 13:
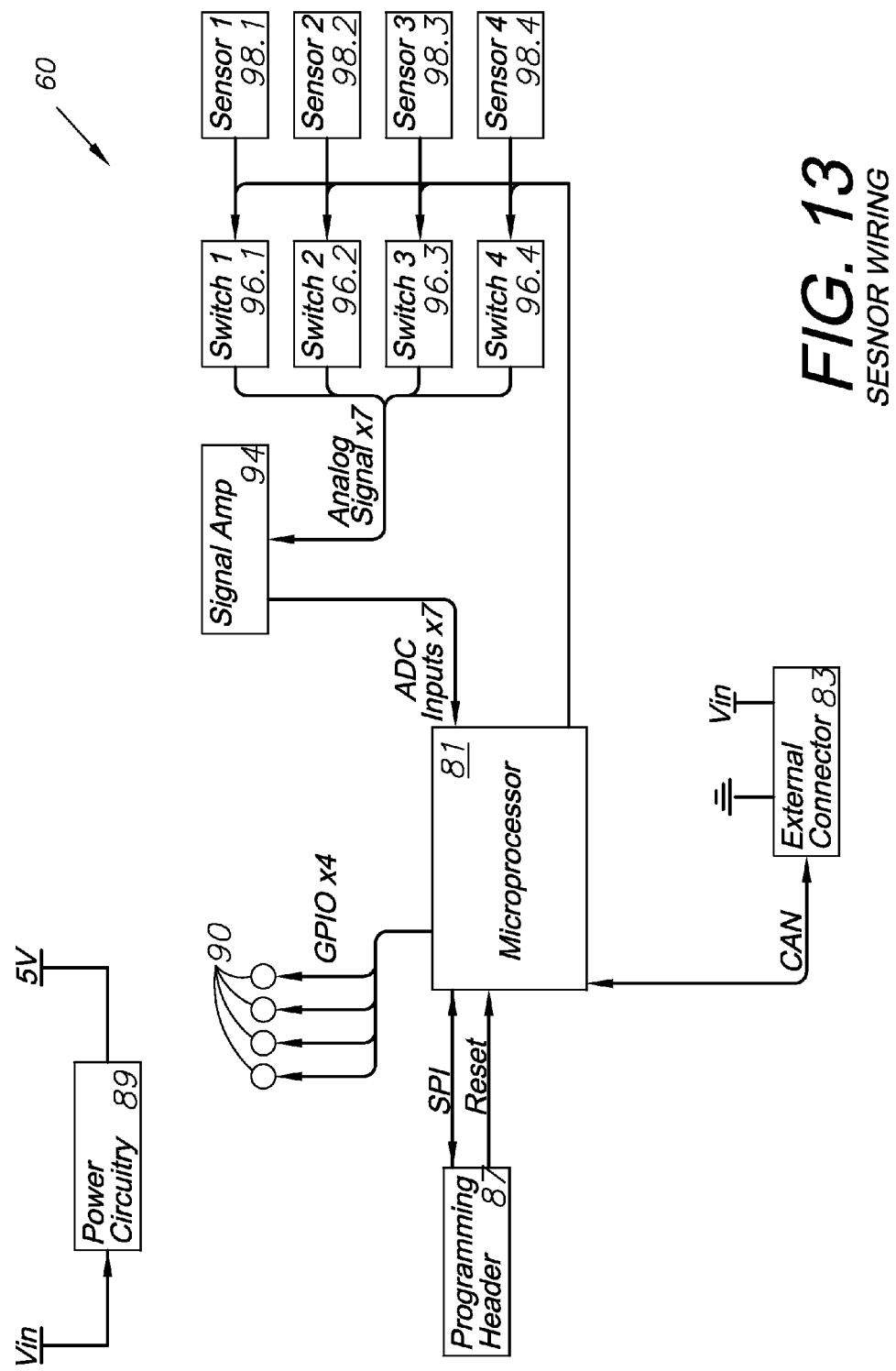
FIG. 13 is a wiring schematic diagram for a sensor device array for use in an embodiment of the present invention.

LEDs 62, 66, 68
Piezo buzzer 85
Detection Level Select 64 button
Drivers: Responsible for configuration and interface with the microprocessor and peripherals. Their implementations are specific to the hardware architecture and microprocessor family.
CAN
Timer FIG. 13 is a wiring diagram for a gauge sensor node 60. A separate microprocessor 81 powers the sensor node wiring system. The microprocessor includes mounted software for handling the various commands and signals received from the sensor arrays 20. Each sensor row 98.1, 98.2, 98.3, 98.4 is connected to a switch 96.1, 96.2, 96.3, 96.4, respectively. The switches 96.1-96.4 select the sensor column arrays 98.1-98.4, and sensor column array selection is performed by the microprocessor 81 which uses general purpose input/output (GPIO) for round-robin sampling. The switches should be similar to the CD74HC Logic Switch manufactured by Texas Instruments Inc. of Dallas, Tex. The switches transfer analog signals from the sensors through a signal amp 94. The signal amp converts the analog signals to digital, and these analog-to-digital signals are reported to the microprocessor 81. Row status LEDs 90 may be connected to the microprocessor, which can provide the status of each row of sensors 20 to the operator. A programming header 87 is connected to the microprocessor 81. The processor is also connected to an external connector 83. Power circuitry 89 is included to handle power to the display wiring circuit.

Figure 14:
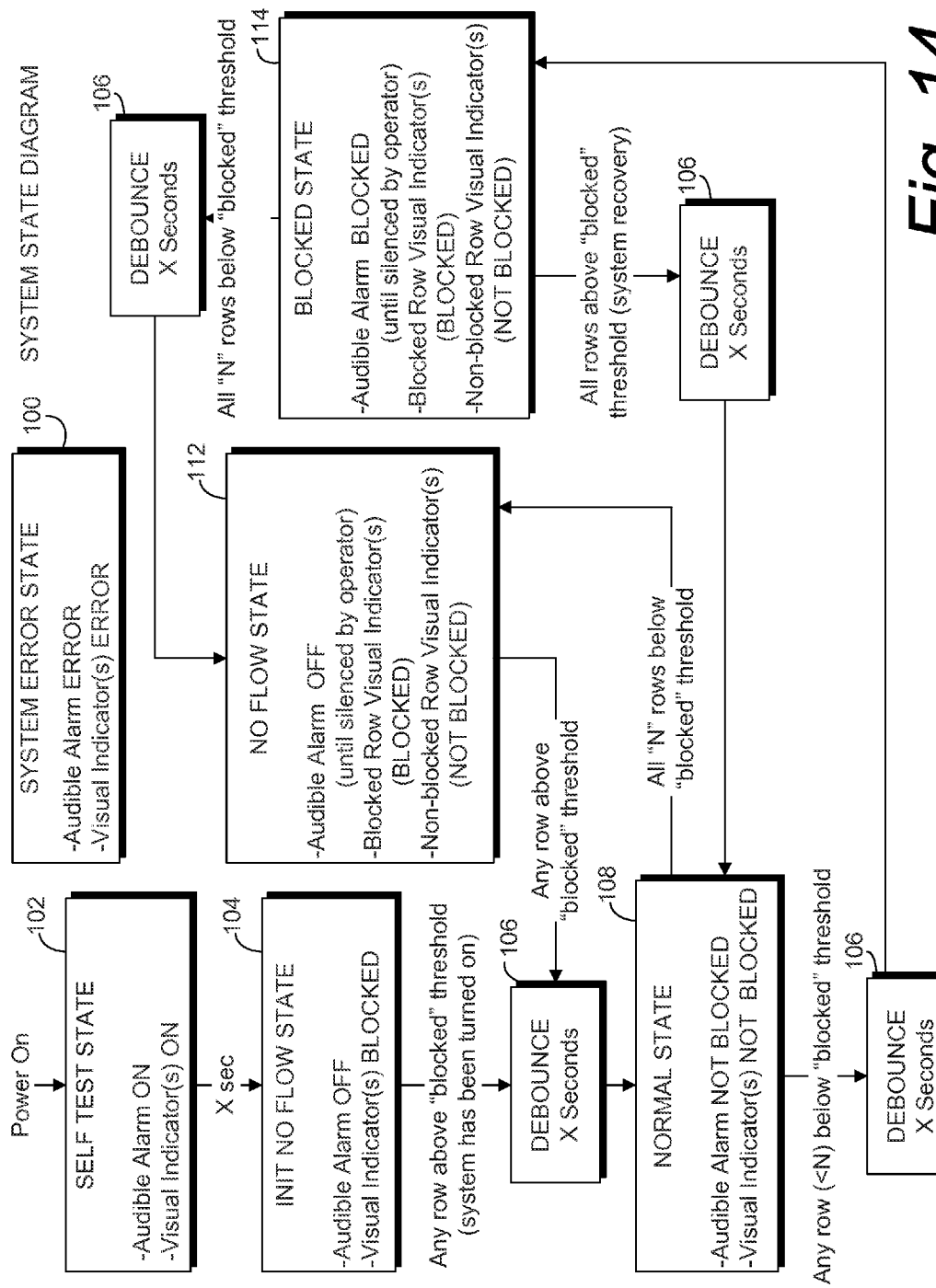
FIG. 14 is a flow chart showing a number of steps representing the various system states of an embodiment of the present invention.

The microprocessor 81 code base is responsible for processing data provided by the magnetic field sensors/Hall-Effect sensors as well as CAN bus communication with other modules within the system. The microprocessor software is not based on a high level operating system but will instead use a cyclic executive real-time scheduler to keep precise timing of task execution with low overhead. Listed below are the primary components of the microprocessor software and their responsibilities:

Bootloader: Provides ability to write an updated application to the internal flash via the CAN communications link and load the application from flash and execute it.
Scheduler: Manages the execution and timing of all tasks.
Analog-to-Digital Converter (ADC) Processor: Manages the selection and digital conversion of sensor columns and stores this raw data in random access memory (RAM) for processing.
Flow Metric Processor: Performs flow analysis calculations and filtering based on raw sensor data.
CAN Message Processor: Filters and processes incoming and outgoing messages from the CAN bus.
CAN Metric Transmission: Aggregates the blockage and flow rate status of all sensor columns into a message sent over the CAN interface.
Tasks: Schedulable items of the system that represent an execution path of code that will be run for a defined interval.
ADC Sensor Sampling
Flow Analysis
CAN data packaging
CAN Transmitter
CAN Receiver Processing
Services: Implement logic that uses a component or driver to produce a desired behavior.
Scheduler
Configuration
Components: Represent hardware devices external to the microprocessor. Their implementations are specific to the part number they are designed for and make use of one or more drivers to interface with the microprocessor/peripherals.
LED
Hall-Effect Sensors
Row Selection Switches
Analog Signal Amplifier
Drivers: Responsible for configuration and interface with the microprocessor and peripherals. Their implementations are specific to the hardware architecture and microprocessor family.
CAN
ADC
Digital-to-Analog Converter (DAC)
Timer
GPIO FIG. 14 is a flow chart showing a system state diagram for the liquid flow sensor system 2 detecting a "blocked" versus a "not-blocked" state. The system is powered on and a self test state is performed at 102. This tests the audible alarm and the visual indicators of the user interface 12, such as the various LEDs and the audible alarm, which are both set to "on." This step occurs for a predetermined number of seconds.

Next the initial flow state is set to "blocked" at 104. The audible alarm is turned off, but the visual LEDs indicate the rows as "blocked" for any row below the preset threshold level (one through six). However, it may be necessary to include at least one row above the threshold to reach this state. Otherwise the system assumes the pump is off. The system debounces at 106 for a predetermined time limit, and then a normal state is initiated at 108, wherein the audible alarm and visual indicators both register as "not-blocked."

Again, the system debounces at 106 until a blocked state is determined at 114. The audible alarm and blocked rows both indicated "blocked," but non-blocked rows remain visually indicated as "not blocked." The system debounces at 106 again until a normal state is again detected at 108. This would occur if the blockage is removed manually or if the threshold level is lowered by the operator via the user interface.

If all rows are below the set threshold, a "no-flow state" is initiated at 112. The audible alarm is turned off, but the blocked rows are visually indicated as "blocked." Non-blocked rows, if any, would be visually indicated as "not blocked." This occurs until any row is raised above the "blocked" threshold, at which time the "normal state" is again entered into.

A system error state exists at 100 if the sensor system or user interface detects an error. This may occur at any time due to an electrical error or a mechanical failure within the system. Both the audible alarm and visual indicators register as "error" at this step. For example, at start-up, the system detects that the magnetic field detected by each sensor 20 in a row is below a specified threshold. This helps to determine whether there is a magnet installed in that particular row. If none is detected, that row's LED is turned off and it is ignored for blockage reporting purposes.

Figure 15:
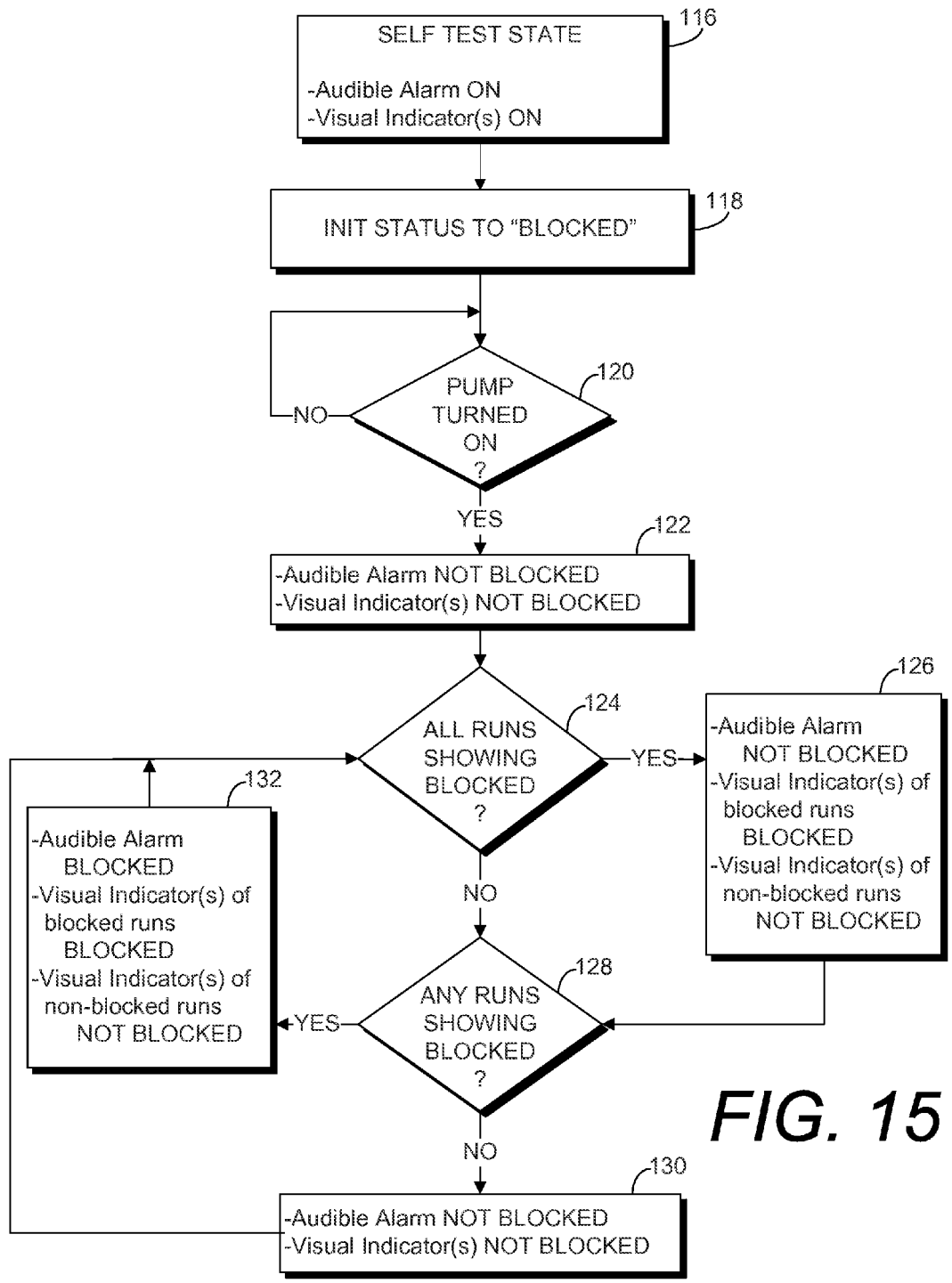
FIG. 15 is a flow chart demonstrating the steps taken during the operation of an embodiment of the present invention.

FIG. 15 is a flow chart of the steps the flow monitoring system 2 employs during a typical operation. After the system is powered on, a self test state is performed at 116. This tests the audible alarm and the visual indicators of the user interface 12, such as the various LEDs.

Next the initial status of the sensors is set to "blocked" at 118. The system starts in the "blocked" status to allow the system to self-report that everything is running correctly. The other option would be to assume that all subsystems are running correctly until the system notifies the operator of a problem. Each separate gauge 4 is indicated as "blocked" prior to initializing the liquid application system. If a gauge does not show "blocked," the operator should be alerted that an error has occurred within the sensor system.

The system then checks to determine whether the pump 52 has been powered at 120. This check continues until the system determines that the pump has been powered, which is determined by reading the position of the balls 34 within the gauges 4. If the ball is at a point greater than or equal to one level above the "blocked" threshold, the system assumes the pump is running. The system proceeds to monitor the sensors. At 122, the audible alarm should turn off and indicate "not blocked," and the visual indicators should indicate the same.

A check is performed at 124 to determine whether all of the runs are showing a "blocked" result. If yes, at 126 the audible alarm should indicate a "not-blocked" or "ready" status, the visual indicators of the blocked liquid lines should indicate a "blocked" status, and the visual indicators for the non-blocked liquid lines should indicate a "non-blocked" or "ready" status.

A check is performed at 128 to determine whether any runs are showing as "blocked." If yes, at 132 the audible alarm should indicate "blocked" status, the visual indicators of the blocked liquid lines should indicate a "blocked" status, and the visual indicators for the non-blocked liquid lines should indicate a "non-blocked" or "ready" status.

If at 128 no liquid lines are indicated as blocked, then at 130 the audible alarm should indicate a "not-blocked" status, and all visual indicators should indicate a "not-blocked" status. This series of steps continues until the pump is shut off and the monitoring system is powered off.

III. Alternative Embodiment Flow Blockage Sensor System 202

Figure 16:
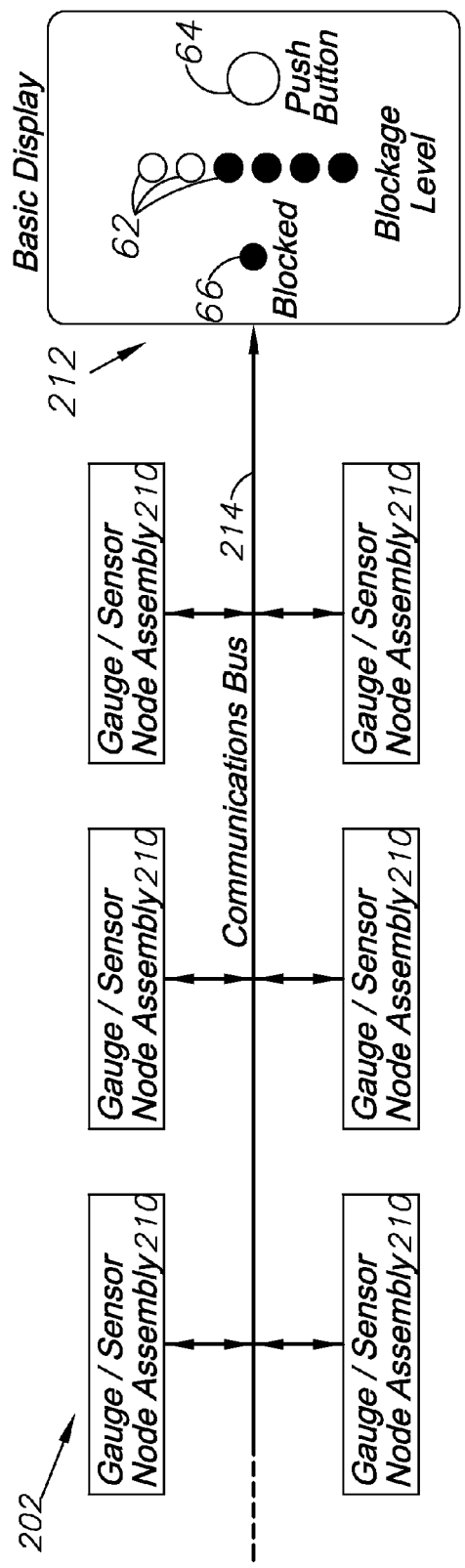
FIG. 16 is a box-diagram schematic of an alternative embodiment of the present invention pertaining specifically to the interaction between a plurality of sensor elements and an alternative display device.

FIG. 16 shows a basic connection diagram for connecting a number of gauge and sensor node assemblies 210 to a display device 212 via a communications bus 214. This presents an alternative connection and communications set-up from a similar design shown in FIG. 11. The display device 212 shows an alternative arrangement of elements, including level LEDs 62, "blocked" status LED 66, and a push button 64.

IV. Alternative Embodiment Flow Blockage Sensor System 252

In an alternative embodiment flow blockage sensor system 252, much of the system architecture remains the same as described above. However, new technology can be utilized to provide additional information and enhanced options to an operator. In such a system, a wireless tablet computer, such as the iPad® manufactured by Apple, Inc. of Cupertino, Calif., is provided to the vehicle operator. This table computer operates as a smart user interface 262 which, unlike the user interface described above, can provide the operator with the status of each and every flow gauge 4 in the liquid applicator system. The operator can also set a separate threshold level for each gauge using the interface.

Figure 17:
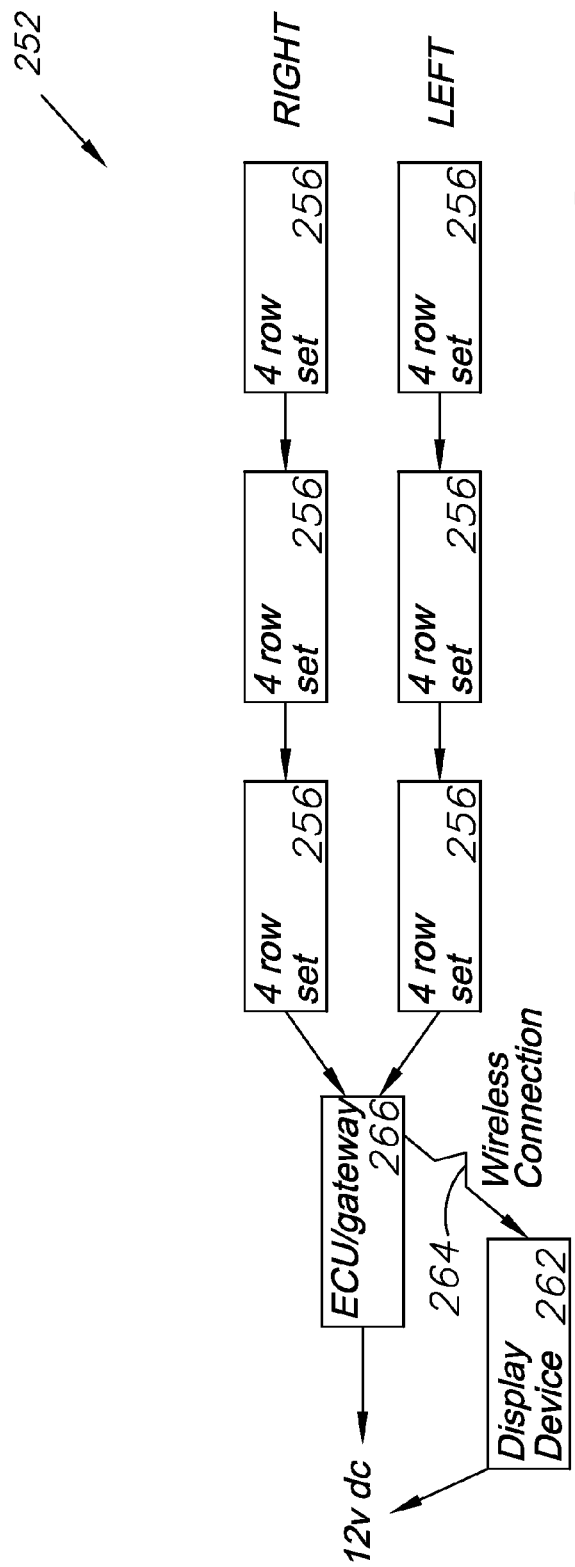
FIG. 17 is a box-diagram schematic of a system embodying an aspect of an alternative embodiment of the present invention.

FIG. 17 shows a general box diagram of a typical set-up of this alternative embodiment system employing three sets 256 or arrays of four flow gauges 4 mounted on either side of the liquid applicator implement 10. As shown, three sets 256 are mounted to each of the left and right sides of the liquid applicator, respectively. Each set 256 is electronically wired to the adjacent set of gauges, and each side is separately wired to an ECU gateway 266 which provides a wireless connection 264 to the user interface 262 display device. The user interface is triggered if any gauge 4 within any array 256 is triggered, thereby indicated to the operator that a blockage has occurred, and indicates specifically which gauge has detected a block.

Figure 18:
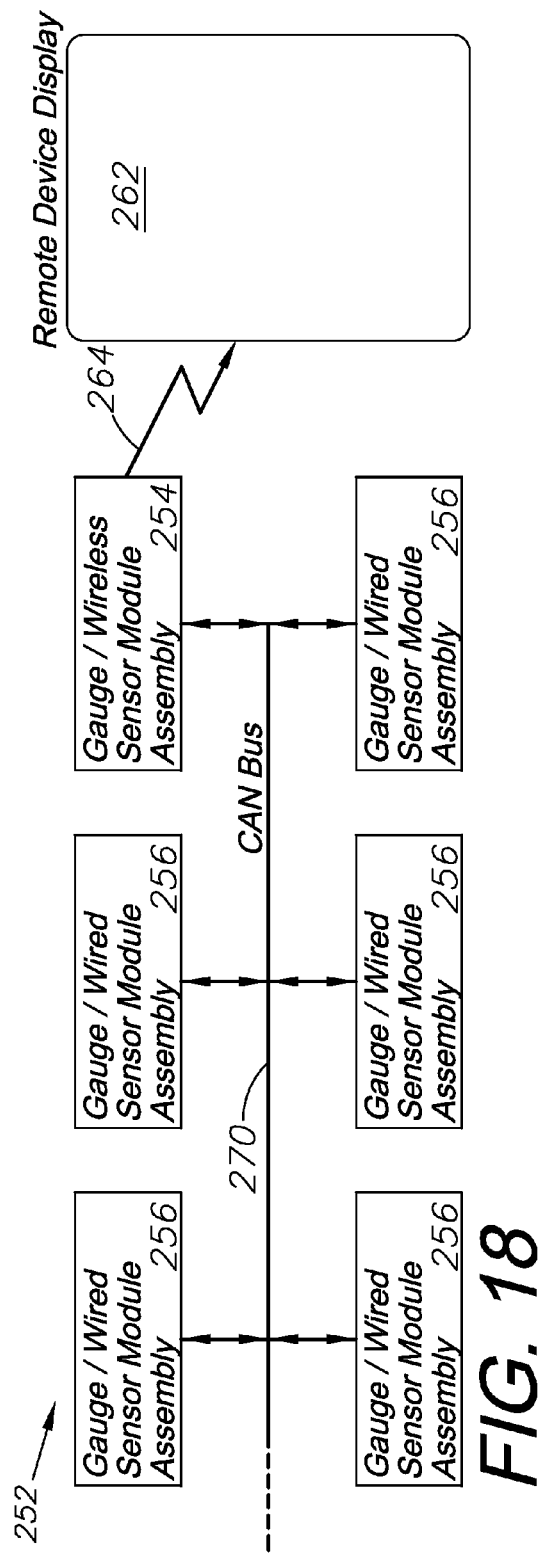
FIG. 18 is a box-diagram schematic of a system embodying an aspect of an alternative embodiment of the present invention pertaining specifically to the interaction between a plurality of sensor elements and a display device.

FIG. 18 provides a basic example of how the gauge and sensor system node communicate with the user interface 262. FIG. 18 presents a system wherein a single CAN Bus 270 electrically wires a number of wired sensor module assemblies 256 to a single wireless sensor module assembly 254. The lone wireless sensor module assembly 254 then wirelessly communicates the status of each sensor node module assembly 254, 256 to the user interface 262 over a wireless connection 264. Updates that come from the user interface 262 are communicated wirelessly to the single wireless sensor node module 254, which then updates the wired sensor module assemblies 256 via a wired connection.

Figure 19:
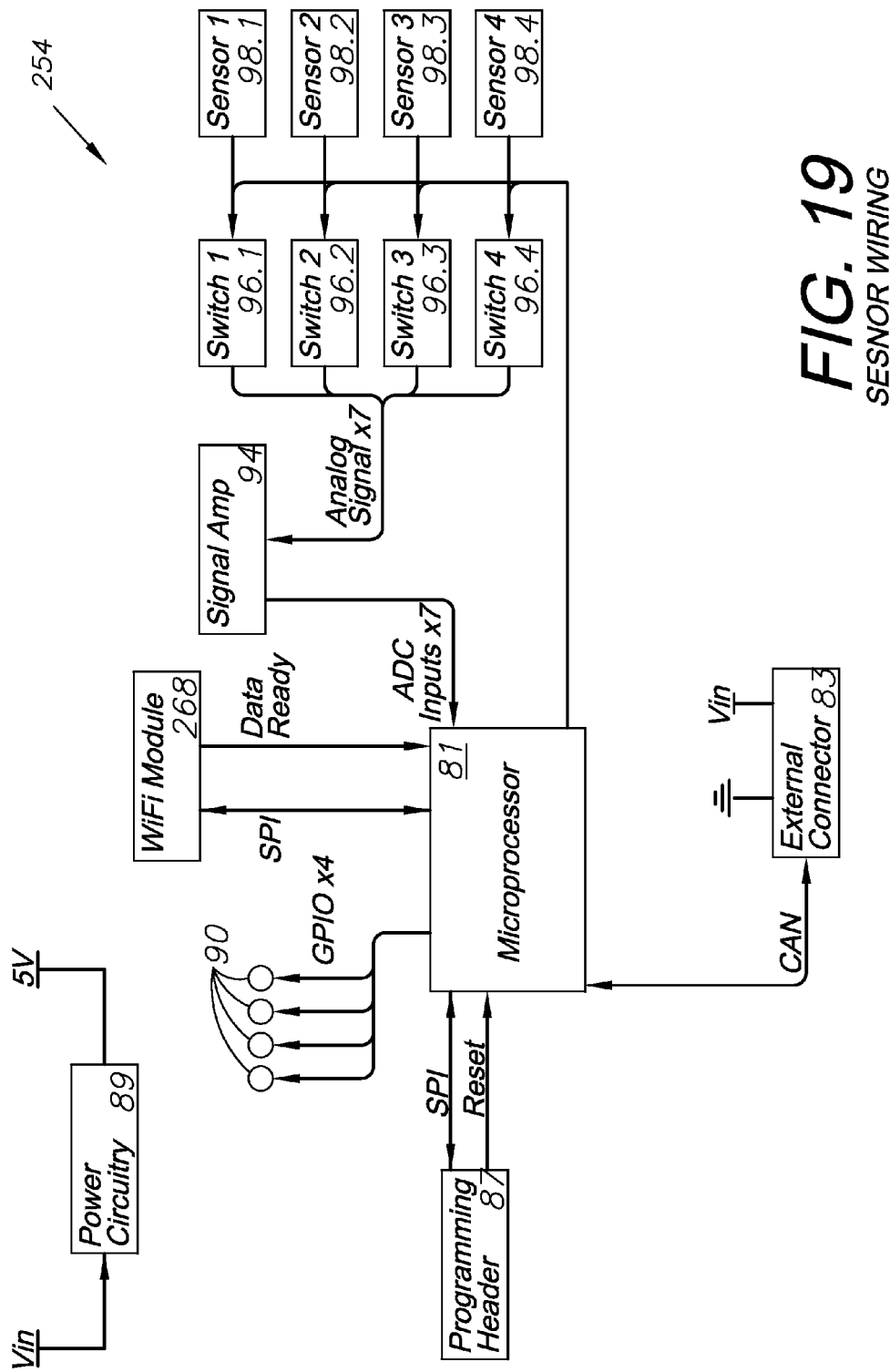
FIG. 19 is a wiring schematic diagram for a sensor device array for use in an alternative embodiment of the present invention.

FIG. 19 shows a sensor wiring diagram for the alternative embodiment sensor module 254. The wiring architecture is identical to that of FIG. 13, except that a WiFi module 268 is communicatively connected to the processor 81. This WiFi module allows the sensor module 254 to wirelessly communicate with the user interface 262 as described above. WiFi provides electronic devices a means for exchanging data wirelessly, using radio waves, over a network. Other wireless communications networks could replace WiFi for similar results.

The microprocessor code base is responsible for processing data provided by the magnetic field sensors/Hall-Effect sensors as well as CAN bus and WiFi communication with other modules within the system. The microprocessor software is not based on a high level operating system but will instead use a cyclic executive real-time scheduler to keep precise timing of task execution with low overhead. Listed below are the primary components of the microprocessor software and their responsibilities:

Bootloader: Provides ability to write an updated application to the internal flash via CAN or wireless link and load the application from flash and execute it.

Scheduler: Manages the execution and timing of all tasks.

ADC Processor: Manages the selection and digital conversion of sensor columns and stores this raw data in RAM for processing.

WiFi Processor: Filters and processes incoming messages from the WiFi module.

WiFi Transmission: Aggregates the blockage and flow rate status of all CAN-connected Sensor Modules into messages; sends data to the iPad app or another Wireless Module via WiFi.

Flow Metric Processor: Performs flow analysis calculations and filtering based on raw sensor data.

CAN Message Processor: Filters and processes incoming messages from the CAN bus.

Tasks: Schedulable items of the system that represent an execution path of code that will be run for a defined interval.

ADC Sensor Sampling
Flow Analysis
CAN data packaging
WiFi Transmission
CAN Receiver Processing
WiFi Receiver Processing Services: Implement logic that uses a component or driver to produce a desired behavior.

Scheduler
Configuration

Components: Represent hardware devices external to the microprocessor. Their implementations are specific to the part number they are designed for and make use of one or more drivers to interface with the microprocessor/peripherals.
WiFi Module
LED
Hall-Effect Sensors
Row Selection Switches
Analog Signal Amplifier
Drivers: Responsible for configuration and interface with the microprocessor and peripherals. Their implementations are specific to the hardware architecture and microprocessor family.
CAN
Serial Peripheral Interface Analog-to-Digital Converter (SPIADC)
DAC
Timer
GPIO V. Alternative Embodiment Flow Rate Sensor System 302

Figure 20:
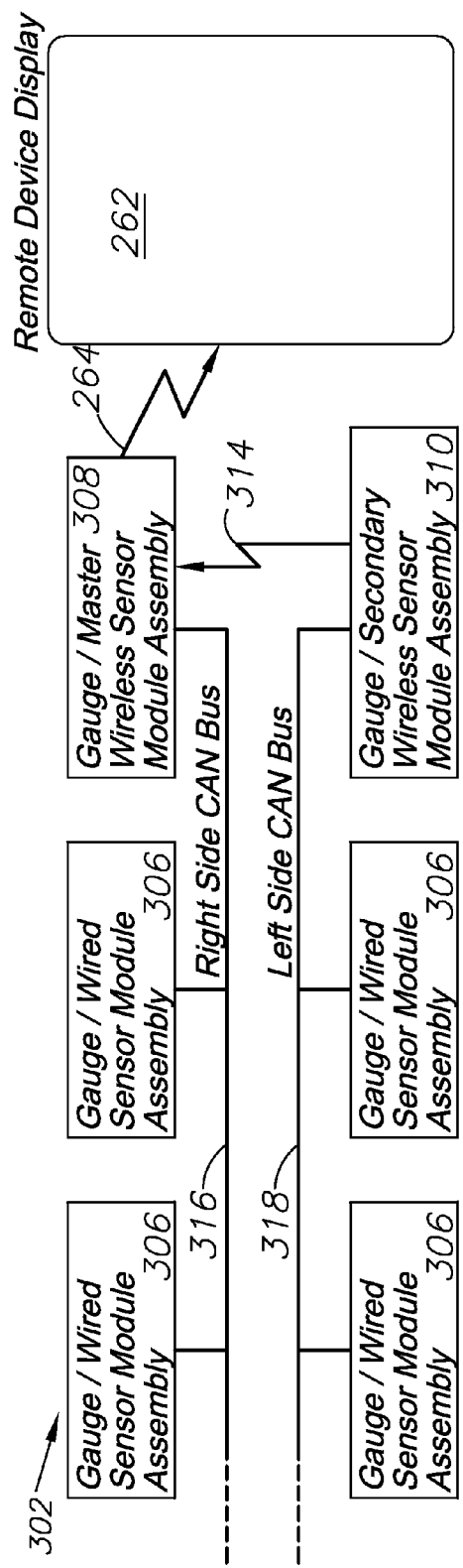
FIG. 20 is a box-diagram schematic of an alternative embodiment of the present invention pertaining specifically to the interaction between a plurality of sensor elements and a display device.

FIG. 20 presents an alternative embodiment flow rate monitoring system 302 where the right side and left side of the liquid applicator are wired separately. A right side CAN bus 316 wires a number of wired sensor module assemblies 306 to a single master wireless sensor assembly 308. A left side CAN bus 318 wires a number of wired sensor module assemblies 306 to a single secondary wireless sensor module assembly 310. The secondary wireless sensor module assembly 310 communicates wirelessly over a wireless connection 314 with the master wireless sensor module assembly 308. Similarly to the system shown in FIG. 18, the master wireless sensor module assembly 308 then wirelessly communicates the status of each sensor node module assembly 306, 308, 310 to the user interface 312 over a wireless connection 264. Updates that come from the user interface 312 are communicated wirelessly to the master wireless sensor node module 308, which then updates the wired sensor module assemblies 306 via a wired connection on the right side CAN bus, and wirelessly updates the secondary wireless sensor module assembly 310, which then updates the wired sensor module assemblies 306 via a wired connection on the left side CAN bus. It should be noted that any CAN communication link could be a wireless communication link. CAN links are utilized as a cost-saving measure.

The master wireless sensor node module 308 and secondary wireless sensor node module 310 would likewise include a WiFi module 268 for wireless communication with each other and the user interface, as discussed in the previous embodiment and shown at FIG. 19.

Above is discussed a situation where the flow rate through liquid lines and liquid monitoring gauges is lowered or blocked completely. It should be pointed out that the system could also operate to alert a user or operator when too much flow is traveling through the flow gauges and/or liquid lines. This may occur if a line is punctured or broken in some way. The level indicator ball 34 would be forced vertically upward, even towards the top of the flow gauge 4. The user interface would alert the user to this occurrence, allowing the user to remedy the problem.

VI. Alternative Embodiment "Self-Healing" Flow Rate Monitoring System 402

Figure 21:
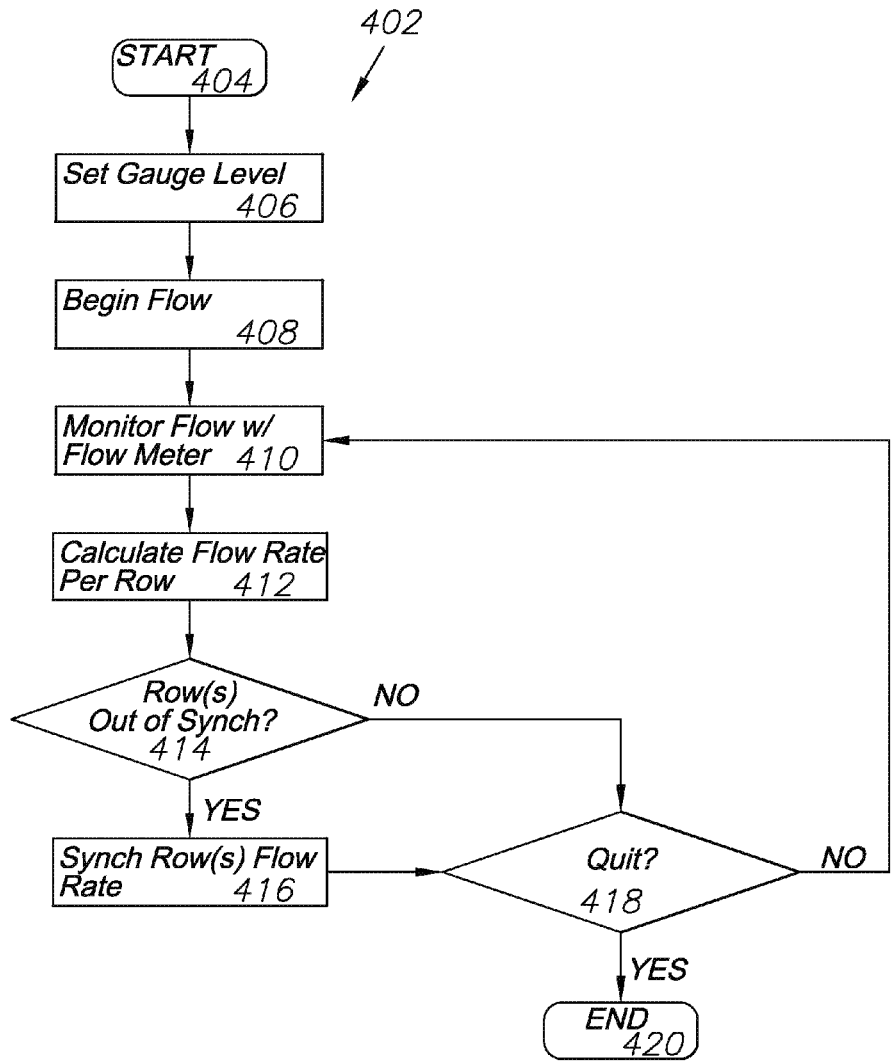
FIG. 21 is a flow chart demonstrating a method of practicing an embodiment of the present invention.

FIG. 21 demonstrates the steps necessary for practicing a method embodying yet another aspect of the present invention. In such an embodiment, a controller will be hooked up to a monitor, which said controller could automatically adjust the flow rate in one or more of the flow gauge rows.

The method starts at step 404. The gauge levels are set or reset at 406, such that they will be in a desired or default position regarding flow. The flow begins at 408, with the liquid passing from the tank and through a flow meter before reaching the individual gauges and being applied to the field.

The system will monitor the flow through the flow meter at 410, and will calculate the flow through each individual gauge at 412 based upon the height of the magnetic ball 34 within the gauge 4. The system controller will monitor each gauge to see if one or more of the rows are out of synch at 414. This means that the system will determine if one or more of the magnetic balls are out of position either compared with the remainder of the gauges or with a preset baseline.

If there are one or more rows out of synch, the particular row will be cleared or the flow to that row will be altered such that all rows are synched again at 416. If no row is out of synch or if the rows are re-synched, the user may select to quit at 418. If the user quits, the method ends at 420. Otherwise the system returns to monitoring the flow rate of the flow meter in comparison with each of the gauges.

These steps allow the control system to "self-heal," which ensures that the flow rate is equal to each row and through each gauge. Pre-determined mathematical calculations based upon the properties of the liquid being applied and the size of the liquid lines, flow meter, and other equipment may be used to determine the appropriate rate of application. This can then be checked using the flow rate measurement at each flow gauge. The user interface can also display the calculated flow rate numbers per liquid line, and using a sufficiently integrated user interface, adjust the flow rates accordingly.

Alternatively, a controller could be connected to read each gauge separately, rather than the flow meter. This would serve the same function as above but would alter the calculations necessary. The system would simply compare each flow rate to the remainder of the gauges to determine whether any discrepancies exist such that a blockage is likely. The system could simply increase flow to that particular row in the event of low flow (or conversely reduce flow in the event of abnormally high flow) or, as above, could notify the user that a row has become blocked in the event of a complete blockage of flow.

It is to be understood that the invention can be embodied in various forms, and is not to be limited to the examples discussed above. The range of components and configurations which can be utilized in the practice of the present invention is virtually unlimited.

Having thus described the invention, what is claimed as new and desired to be secured by Letter Patent is:

1. A flow rate monitoring system for use with a liquid distribution system, the monitoring system comprising:
   a flow gauge including a housing through which liquid may flow, said flow gauge connected to the liquid distribution system via a liquid feed line;
   an indicator located within said housing;
   a sensor assembly including a sensor and affixed to an external face of said housing, said sensor adapted for detecting a status of said flow gauge comprising either blocked or not blocked;
   a mobile computing device including a processor, data storage, and a graphical user interface, said mobile computing device communicating with said sensor assembly and configured to produce a visual indication comprising either blocked or not blocked; said sensor adapted for detecting the vertical location of said indicator within said housing;
   said processor configured to send and receive signals from said sensor, thereby adjusting the settings of said sensor and reporting the signals from said sensor to said user interface;

wherein the vertical location of said indicator relative to said housing is dependent upon the flow rate of liquid through said housing;

a selectively adjustable liquid flow rate target for said flow gauge;

said user interface adapted for indicating when the measured flow rate through said flow gauge diverges from said selectively adjustable liquid flow rate target;

a flow controller adapted for receiving commands from said user interface; and said user interface is further configured to respond to a change in said measured flow rate through said flow gauge.

* * * * *